(12) United States Patent
McKee et al.

(10) Patent No.: US 11,222,475 B2
(45) Date of Patent: Jan. 11, 2022

(54) COMPUTER SYSTEMS AND METHODS FOR NAVIGATING BUILDING INFORMATION MODELS IN AN AUGMENTED ENVIRONMENT

(71) Applicant: Procore Technologies, Inc., Carpinteria, CA (US)

(72) Inventors: Kevin McKee, Carpinteria, CA (US); Jon Hoover, Camarillo, CA (US); Christopher Bindloss, Santa Barbara, CA (US); David McCool, Carpinteria, CA (US); Winson Chu, Alameda, CA (US); Christopher Myers, Oakland, CA (US)

(73) Assignee: Procore Technologies, Inc., Carpinteria, CA (US)

( * ) Notice: Subject to any disclaimer, the term of this patent is extended or adjusted under 35 U.S.C. 154(b) by 0 days.

(21) Appl. No.: 16/920,138

(22) Filed: Jul. 2, 2020

(65) Prior Publication Data

US 2021/0225083 A1    Jul. 22, 2021

Related U.S. Application Data

(60) Provisional application No. 62/964,531, filed on Jan. 22, 2020.

(51) Int. Cl.
*G06T 19/00* (2011.01)
*G06F 3/0484* (2013.01)
(Continued)

(52) U.S. Cl.
CPC ........ *G06T 19/006* (2013.01); *G06F 3/04815* (2013.01); *G06F 3/04845* (2013.01); *G06F 3/167* (2013.01)

(58) Field of Classification Search
None
See application file for complete search history.

(56) References Cited

U.S. PATENT DOCUMENTS

| 9,726,885 | B2 * | 8/2017 | Cummings | ............ G06Q 50/08 |
| 2018/0012125 | A1 * | 1/2018 | Ladha | ..................... G01S 17/89 |

(Continued)

OTHER PUBLICATIONS

International Searching Authority, International Search Report and Written Opinion, PCT/US2021/014588, dated May 10, 2021, 9 pages.

*Primary Examiner* — Nicholas R Wilson
(74) *Attorney, Agent, or Firm* — Lee Sullivan Shea & Smith LLP

(57) ABSTRACT

Disclosed herein is software technology that leverages improved AR technology to facilitate presentation of virtual content overlaid on a view of a real-world environment. Additionally, also disclosed herein is an "insights" software application that functions to provide insights about the real-world environment. In one aspect, disclosed herein is a method that involves an AR-enabled device that includes one or more sensors, a user input interface, a display screen and is configured to (1) based on user input, determine an initial position and orientation of the computing device within a virtual 3D model of a real-world environment; (2) align the virtual 3D model of the real-world environment with the real-world environment; and (3) cause a display screen to present the aligned virtual 3D model as overlaid virtual content on a view of the real-world environment.

20 Claims, 8 Drawing Sheets

(51) Int. Cl.
    *G06F 3/0481*     (2013.01)
    *G06F 3/16*     (2006.01)

(56) References Cited

U.S. PATENT DOCUMENTS

| | | |
|---|---|---|
| 2018/0107269 A1 | 4/2018 | Benzies |
| 2018/0190015 A1 | 7/2018 | Chen et al. |
| 2018/0322700 A1 | 11/2018 | Carr et al. |
| 2019/0236847 A1 | 8/2019 | Neil |
| 2019/0325662 A1 | 10/2019 | Skidmore |

* cited by examiner

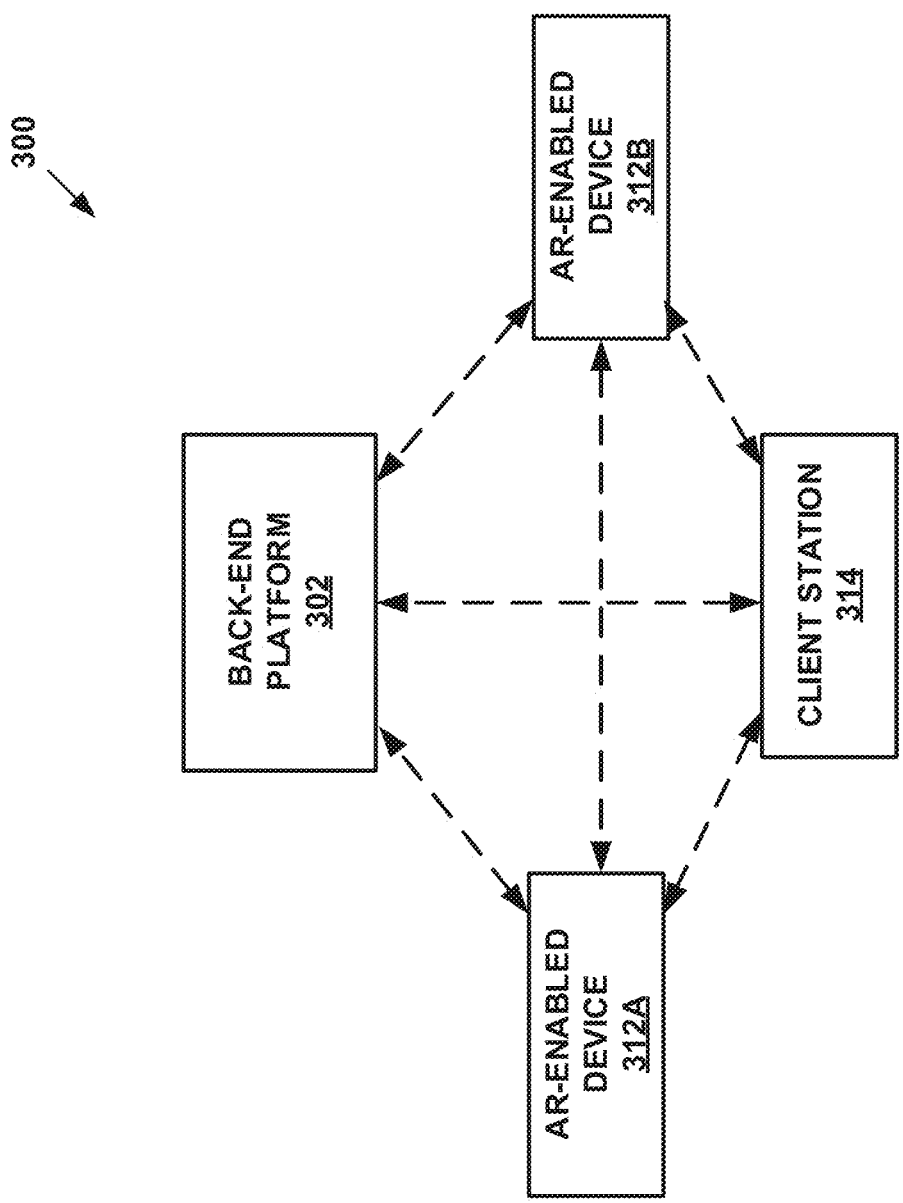

COMPUTER SYSTEMS AND METHODS FOR NAVIGATING BUILDING INFORMATION MODELS IN AN AUGMENTED ENVIRONMENT

CROSS-REFERENCE TO RELATED APPLICATION

This application claims the benefit of priority under 35 U.S.C. § 119(e) to U.S. provisional application No. 62/964,531, filed on Jan. 22, 2020 and titled "Computer Systems and Methods for Navigating Building Information Models in an Augmented Environment," the contents of which is incorporated by reference herein in its entirety.

BACKGROUND

Augmented Reality ("AR") is a technology that overlays computer-generated graphics (i.e., virtual content) on a view of a real-world environment to provide an enhanced view of the real-world environment. In this respect, virtual content is generally superimposed in such a way as to appear as a natural part of the real-world environment.

To superimpose virtual content on a view of the real-world environment, a computing device with AR capabilities (which may be referred to herein as an "AR-enabled device"), generally functions to present a view of the real-world environment that has overlaid virtual content, which may be generated by the AR-enabled device or received from another computing device. Many types of AR-enabled devices exist, such as a smartphone, tablet, laptop, and wearable devices (e.g., head-mounted displays), among other computing devices. Depending on the type of AR-enabled device being used to experience AR, an enhanced view that superimposes virtual content on a view of the real-world environment may be presented in various manners.

For example, in certain types of AR-enabled devices such as a head-mounted display, the view of the real-world environment may be what the user perceives through the lens of the head-mounted display, and the enhanced view may be presented on the head-mounted display with virtual content overlaid on the view of the real-world environment. As another example, the enhanced view may be presented on a display screen of an AR-enabled device, in which case the computing device may comprise a camera that captures the real-world environment in the form of image data that is presented via the display screen along with the overlaid virtual content.

OVERVIEW

AR can provide value in various fields in which the use of AR is currently limited. For instance, AR can enhance user experience in various fields, including construction, industrial design, entertainment (e.g., gaming), and/or home decoration, as some non-limiting examples.

Generally speaking, in the field of construction, a construction project may involve the creation, review, and sometimes revision, of plans of the construction project. These plans may comprise visual representations of the construction project that visually communicate information about the construction project, such as how to assemble or construct the project. Such visual representations tend to take one of at least two different forms.

One form may be a two-dimensional ("2D") model, such as an architectural drawing, a construction blueprint, engineering schematics (or the like), in which 2D line segments of the 2D model represent certain physical elements of the construction project (e.g., walls, ducts, etc.). In this respect, a 2D model may be embodied either in paper form or in a computerized form, such as an image file (e.g., a PDF, JPEG, etc.).

To advance over 2D models, computerized, three-dimensional ("3D") technology was developed as another form in which information about a construction project can be visually communicated. In this respect, a 3D model of the construction project is typically embodied in a computerized form, such as in a Building Information Model ("BIM") file, with 3D meshes visually representing the physical elements of the construction project (e.g., walls, ducts, ceilings, pipes, conduits, etc.). The BIM file can include a vast amount of data describing the individual physical elements of the construction project and the relationships between these individual physical elements, including for instance, the relative position, size, and/or shape of each element, and an indication of where each element will reside in relation to the other elements in the construction project.

Correspondingly, specialized software has been developed that is capable of accessing a BIM file and rendering a 3D model of the construction project from one or more perspectives. One type of specialized software tool currently exists is known as a "BIM viewer." Generally speaking, the BIM viewer is a software tool that accesses the information contained within a BIM file (or a combination of BIM files) for a particular construction project and then, based on that file (or those files), is configured to cause a client station (e.g., a desktop computer, a laptop, a tablet, or the like) to render a 3D model of the computerized representation of the construction project. The BIM viewer software tool may also facilitate navigation of the rendered 3D model of the construction project. For example, the BIM viewer software tool may facilitate navigation of the 3D model by adjusting the perspective along either or both of the lateral axes, adjusting the perspective directly along the vertical axis, and/or by adjusting the orientation of the perspective along the two lateral axes and the vertical axis.

In practice, to facilitate these types of navigation, the BIM viewer software tool may generate a graphical user interface (GUI) that presents the 3D model of the construction project as well as one or more navigational controls overlaid on the 3D model. The BIM viewer tool may also be configured to receive user input at the navigational controls (e.g., a touch, or a touch combined with a drag), and, based on a respective user input, change the position of the perspective from which the BIM viewer tool renders the 3D model. These navigational controls may take various forms.

As some possibilities, these navigational controls may take the form of one or more of (1) a "Walk" navigational control through which a user may provide a user input in order to reposition the perspective of the 3D model in any direction laterally and at variable speed regardless of the current perspective's orientation, (2) an "Up/Down" navigational control through which a user may provide a user input in order to reposition the perspective of the 3D model up or down along the vertical Z-axis and at variable speed regardless of the current perspective's orientation, (3) a "Look" navigational control through which a user may provide a user input in order to reposition the orientation of the perspective of the 3D model in any direction laterally and at variable speed regardless of the current perspective's orientation, (4) a 2D inset control through which a user may immediately relocate the perspective to any position within the construction project and at any orientation, and (5) an "elevation control" control through which a user may provide a user input in order to reposition the perspective of the 3D model to a preset position along the vertical Z-axis to provide a view of a particular floor of the construction project, among combinations of the forgoing navigational controls as well as other possibilities.

Existing BIM viewer software tools are typically deployed on client stations (e.g., a desktop computer, a laptop, a tablet, or the like), which may have drawbacks. First, such client stations running a BIM viewer software tool may provide an inadequate user experience. For instance, such client stations running a BIM viewer software tool may have navigation controls (such as the navigation controls described above) that are unintuitive to many users, and navigation typically requires multiple user inputs to reposition the perspective and/or orientation of the 3D model in a manner desired by a user. As a result, there is typically a learning curve for the user to navigate the rendered 3D model and navigating the rendered 3D model using the navigation controls can often times be inefficient.

Second, while a BIM viewer software tool can be deployed on client stations to visually communicate information about a construction project, some level of comprehension of the rendered 3D model is required by the user to compare the 3D model with the construction site for the construction project and gain insights about the construction site for the construction project. For instance, some level of comprehension of the rendered 3D model is required by the user to identify various types of issues (e.g., electrical, mechanical, installation, etc.) associated with the construction project, which may not be readily apparent to the user.

To address these problems and other problems associated with the software tools described above (e.g., the BIM viewer software tool), what is needed is an improved software tool that leverages AR technology in order to facilitate improved navigation and user interaction with a 3D model of a construction project. However, creating such an improved software tool that leverages AR technology presents its own set of challenges. For instance, a relatively accurate alignment of virtual content (e.g., a virtual 3D model of the construction project) on a view of a real-world environment is required, such that the virtual content is rendered in a way as to appear a natural part of the real-world environment. To accomplish this goal, the position and orientation (or sometimes referred to as the "pose") of an AR-enabled device must be determined, and based on the determination, the AR-enabled device must present an enhanced view that properly aligns the virtual content onto the view of the real-world environment.

Currently, some AR software applications exist that are capable of superimposing virtual content onto a view of a real-world environment. For instance, some AR software applications may utilize a visual tracking technique known as "marker-based AR," which generally involves (1) placing a visual marker that is embedded with information identifying virtual content, such as a Quick Response ("QR") code, on a real object, (2) associating the coordinates of where the visual marker was placed with the real object using an AR software application, (3) calculating the position and orientation of an AR-enabled device relative to the visual marker that may be detected by the AR-enabled device, and then (4) providing an enhanced view of the real-world environment by properly aligning the virtual content associated with the visual marker with the view of the real-world environment.

However, this visual tracking technique has many drawbacks for scenarios that involve superimposing virtual content (e.g., a 3D model) on a view of a real-world environment that includes large objects and/or many objects. For instance, the process of placing QR codes on large objects and associating the coordinates of where each QR code was placed on a given object may become impractical in scenarios that involve superimposing virtual content on a real-world environment such as a building, which may include various large objects such as floors, walls, ceilings, or the like.

Further, while a user experiencing AR may detect a QR code with an AR-enabled device to perceive a view of the real-world environment with virtual content that is properly overlaid on the real-world environment, once the AR-enabled device is moved away from the QR code and can no longer detect the QR code, the virtual content that is overlaid on the real-world environment may become misaligned, which degrades the user's AR experience. While some AR software applications may utilize another visual tracking technique known as "markerless AR" to alleviate this problem by relying on the AR-enabled device's sensors (e.g., an accelerometer, a gyroscope, and/or GPS unit) to calculate the pose of the AR-enabled device, such sensors may become unreliable in certain real-world environments as the AR-enabled device is moved away from one area of a real-world environment to another area that is further away from a QR code.

To address these and other problems with existing visual tracking techniques, disclosed herein is software technology that leverages improved AR technology to facilitate presentation of virtual content (e.g., a 2D model of a construction project, a 3D model of a construction project, etc.) overlaid on a view of a real-world environment (e.g., a construction site for the construction project). At a high level, the disclosed software technology may include an AR software application that comprises (1) a first software component that functions to position an AR-enabled device within a virtual 3D model of a real-world environment, (2) a second software component that functions to establish alignment between the virtual 3D model of the real-world environment and the real-world environment, and (3) a third software component that functions to navigate the virtual 3D model of the real-world environment as a user navigates the real-world environment. The software components of the disclosed AR software application are described in further detail below.

Additionally, also disclosed herein is an "insights" software application that functions to (i) obtain, from one or more computing devices (including but not limited to AR-enabled devices that are provisioned with the disclosed AR software application), a plurality of 3D models of a real-world environment that represent the real-world environment at different periods of time, (ii) compare the obtained plurality of 3D models of the real-world environment, and then (iii) based on the comparison, provide insights about the real-world environment (e.g., insights about how the construction project is progressing). This insights software application is also described in further detail below.

Accordingly, in one aspect, disclosed herein is a method that involves a computing device (e.g., an AR-enabled device) (1) based on user input, determining an initial position and orientation of the computing device within a virtual 3D model of a real-world environment; (2) aligning the virtual 3D model of the real-world environment with the real-world environment; and (3) causing a display screen to present the aligned virtual 3D model as overlaid virtual content on a view of the real-world environment.

In another aspect, disclosed herein is a computing device (e.g., an AR-enabled device) that includes one or more sensors, a user input interface, a display screen, at least one processor, a non-transitory computer-readable medium, and program instructions stored on the non-transitory computer-readable medium that are executable by the at least one processor to cause the computing device to carry out the functions disclosed herein, including but not limited to the functions of the foregoing method.

In yet another aspect, disclosed herein is a non-transitory computer-readable medium having program instructions stored thereon that are executable such that a computing device (e.g., an AR-enabled device) is configured to carry out the functions disclosed herein, including but not limited to the functions of the foregoing method.

One of ordinary skill in the art will appreciate these as well as numerous other aspects in reading the following disclosure.

BRIEF DESCRIPTION OF THE DRAWINGS

FIG. 3 depicts an example network configuration in which example embodiments may be implemented.

DETAILED DESCRIPTION

Figure 1:
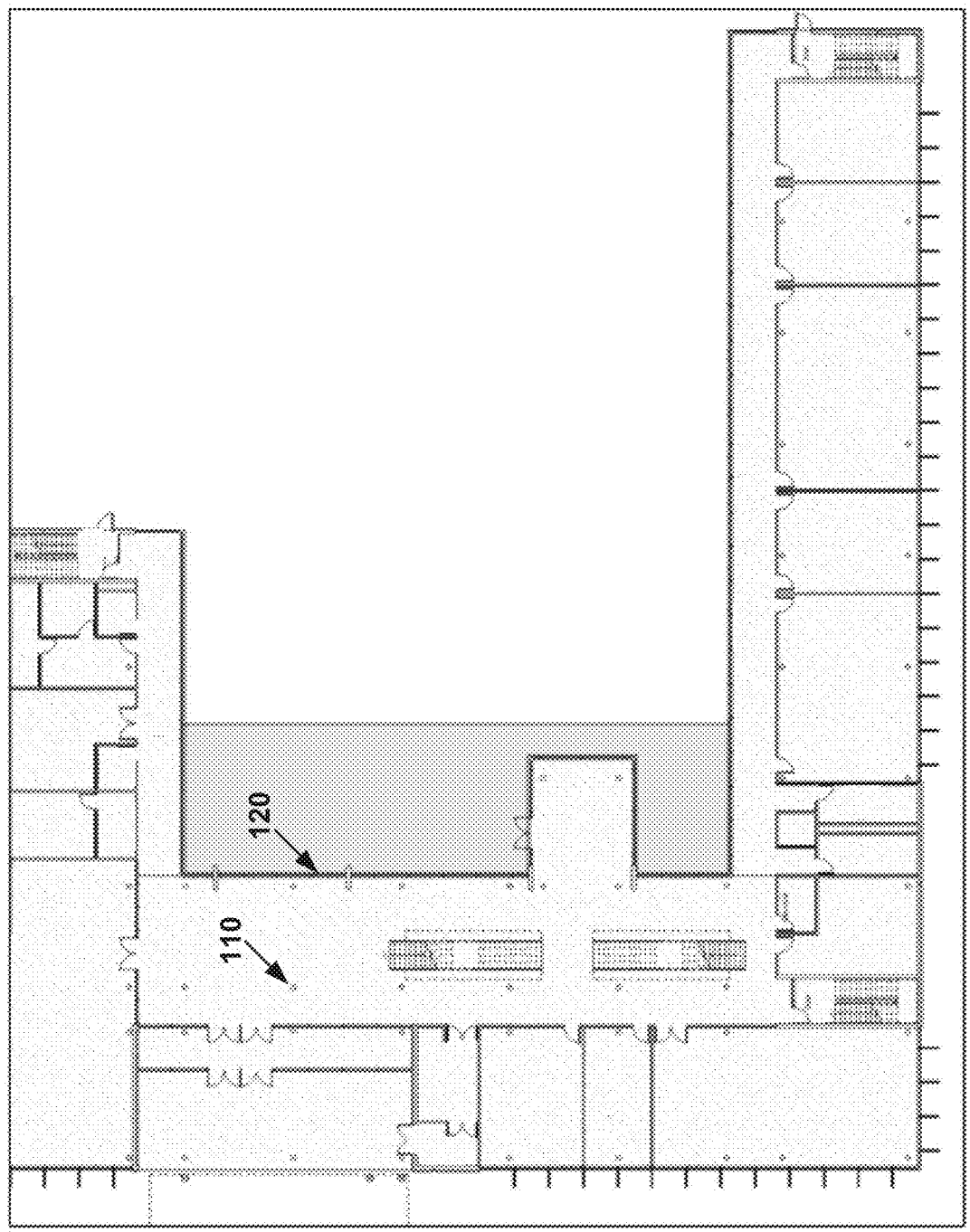
FIG. 1 depicts an example 2D model of a construction project in accordance with the present disclosure.

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

As described above, the present disclosure is generally directed to software technology that leverages improved AR technology to facilitate presentation of virtual content overlaid on a view of a real-world environment. At a high level, the disclosed software technology may be embodied in the form of an AR software application that comprises (1) a first software component that functions to position an AR-enabled device within a virtual three-dimensional ("3D") model of a real-world environment, (2) a second software component that functions to establish alignment between the virtual 3D model of the real-world environment and the real-world environment, and (3) a third software component that functions to navigate the virtual 3D model of the real-world environment as a user navigates the real-world environment.

Additionally, also disclosed herein is an "insights" software application that functions to (i) obtain, from one or more computing devices (including but not limited to AR-enabled devices that are provisioned with the disclosed AR software application), a plurality of 3D models of a real-world environment that represent the real-world environment at different periods of time, (ii) compare the obtained plurality of 3D models of the real-world environment, and then (iii) based on the comparison, provide insights about the real-world environment (e.g., insights about how the construction project is progressing).

In accordance with the present disclosure, an example "real-world environment" described herein may comprise a construction site for a construction project (e.g., a particular construction site for a commercial building and/or residential building), or any other indoor and/or outdoor environment of interest that exists in the real world. Generally speaking, as mentioned above, a construction project may involve the creation, review, and sometimes revision, of plans for the construction project. These plans assist construction professionals (e.g., contractors, project managers, architects, engineers, designers, etc.) in carrying out the construction project. For example, some plans include written statements, such a punch list or submittal log, which may communicate, for instance, what materials are needed during construction. Other plans may include visual representations of the construction project that visually communicate to the construction professionals how to assemble or construct the project.

I. EXAMPLE VISUAL REPRESENTATIONS OF A CONSTRUCTION PROJECT

Visual representations of a construction project tend to take one of at least two different forms described herein, and each visual representation may be overlaid as "virtual content" on a view of the real-world environment.

As one possibility, these visual representations may take the form of a two-dimensional ("2D") model of the construction project, where the 2D model may comprise a 2D technical drawing of the construction project, such as an architectural drawing, a construction blueprint, an engineering schematic, or the like. In general, the 2D model of the construction project may comprise 2D line segments that represent certain physical elements of the construction project (e.g., walls, ducts, etc.). In practice, the 2D model could be embodied in a computerized form, such as an image file (e.g., a PDF, JPEG, etc.), or some other computerized form that can be rendered by an AR-enabled device.

As one example to illustrate, FIG. 1 depicts an example 2D model 100 of a construction project (e.g., a building) that may be overlaid as virtual content on a view of the real-world environment. As shown, 2D model 100 may take the form of an architectural drawing of a construction project that includes various 2D line segments that represent various physical elements of the construction project. For instance, 2D model 100 may include line segment 110 that may represent a given pillar that supports a building, and line segment 120 that may represent a particular wall of the building. As further shown in FIG. 1, 2D model 100 may include various other 2D line segments that are not numerically referenced as well.

Further, visual representations of a construction project may take other forms as well. As another possibility, these visual representations may take the form of a computerized, 3D model of the construction project that may be overlaid as virtual content on a view of the real-world environment.

In order to facilitate the creation and use of a computerized, 3D model of the construction project, one or more construction professionals (e.g., architects, designers, and/or engineers) may engage in a process referred to as Building Information Modeling ("BIM"). As a general matter, "BIM" refers to the process of designing and maintaining a computerized representation of physical and functional characteristics of a construction project, such as a commercial and/or residential building. More specifically, but still by way of example, when one or more construction professionals engage in BIM for a specific construction project, they generally produce what is referred to as a "BIM file." In essence, a "BIM file" is a computerized description of the individual physical elements associated with the construction project, including walls, floors, ceilings, pipes, ducts, and/or conduits, among other elements that are part of the physical structure and/or infrastructure of the construction project.

This computerized description can include a vast amount of data describing the individual physical elements of the construction project and the relationships between these individual physical elements. For example, for an air duct designed to run across the first-floor ceiling of a building, a BIM file for this building may contain data describing how wide, how long, how high, and where, in relation to the other individual physical elements of the construction project, the duct is positioned. In this respect, the data describing the individual physical elements of the construction project and the relationships between these individual physical elements may take various forms.

As one possibility, a BIM file may include "mesh data" that comprises a mesh of geometric triangles that represents a scaled 3D model of the physical element. In this respect, mesh data corresponding to a given physical element may be used to derive the position, size, and/or shape of the given physical element within a 3D model. Specifically, each triangle of the mesh may represent a set of 3D coordinates. For instance, for each triangle of the mesh, the BIM file may contain data describing the coordinates of each vertex of the triangle (e.g., an x-coordinate, a y-coordinate, and a z-coordinate for the first vertex of the triangle; an x-coordinate, a y-coordinate, and a z-coordinate for the second vertex of the triangle; and an x-coordinate, a y-coordinate, and a z-coordinate for the third vertex of the triangle).

In practice, a mesh that represents a scaled model of a physical element may be comprised of thousands, tens of thousands, or even hundreds of thousands of individual triangles, where each triangle may have a respective set of three vertices and corresponding sets of coordinates for those vertices. However, one of ordinary skill in the art will appreciate that a mesh may comprise significantly fewer individual triangles as well.

As another possibility, a BIM file may include "bounding box" data. Conceptually, a "bounding box" is an imaginary box surrounding a mesh on all sides, with the edges of the bounding box being located at the outermost edges of the mesh. As such, the entire mesh may fit inside of this bounding box with no part of the mesh protruding from the bounding box. In this way, the bounding box may represent the maximum dimensions of the mesh in rectangular form, and thus, bounding box data corresponding to a given physical element may be used to derive an approximate position and/or size of the given physical element.

In practice, it may take less storage space to store bounding box data compared to mesh data. This is due to the fact that a mesh may comprise of many thousands of triangles in order to accurately represent the mesh's surface, which in some cases is irregular (e.g., the curved surface of a pipe), whereas a bounding box can typically be represented with just eight vertices of a rectangular box. Accordingly, in some instances, a computing device (e.g., an AR-enabled device) running the disclosed AR software application may operate in a mode designed to conserve processing power and/or storage space by rendering and/or overlaying a virtual 3D model of the construction project that includes a bounding box as opposed to a mesh that represents a scaled model of a given physical element included in the 3D model. By doing so, the disclosed AR software application can visually communicate a "low resolution" version of the construction project.

The data describing the individual physical elements of the construction project and the relationships between these individual physical elements may take various other forms as well.

As another possibility, a BIM file may include data describing the shape of each individual physical element in the construction project (e.g., an air duct). This shape data for each individual physical element in the construction project may take various forms. For instance, for each physical element in the construction project, the shape data may comprise data indicating the orientation of the physical element (e.g., vertical, horizontal, etc.), whether the physical element has a cylindrical, flat, and/or a long shape, among other possibilities.

As yet another possibility, a BIM may include additional data for each individual physical element of the construction project that may not be related to each physical element's specific size, position, and/or shape. For instance, for each individual physical element, this additional data may include data describing what system or sub-system the physical element is associated with (e.g., structural, plumbing, HVAC, electrical, etc.), data describing what material or materials the physical element is made of; what manufacturer the physical element comes from; what stage of manufacture the physical element is in; where the physical element currently resides (e.g., data indicating that the physical element is on a truck for delivery to the construction site, and/or once delivered, data indicating where at the construction site the delivered physical element resides); and/or various identification numbers assigned to the element (e.g., an object identification number, a serial number, part number, model number, tracking number, etc.), as well as others.

The data describing the individual physical elements of the construction project and the relationships between these individual physical elements may take various other forms as well.

In practice, the data describing the individual physical elements of the construction project and the relationships between these individual physical elements may be used for various purposes. For instance, as described in more detail below, an AR-enabled device running the disclosed AR software application may use such data to properly align one or more physical elements included in the 3D model onto respective one or more objects in the view of the real-world environment. The data describing the individual physical elements of the construction project and the relationships between these individual physical elements may be used for various other purposes as well.

Further, as noted above, while the process for producing a BIM file that includes the computerized description associated with the construction project may generally involve one or more construction professionals, it may be possible to produce certain data (e.g., shape data) describing the individual physical elements of the construction project and/or the relationships between these individual physical elements based on one or more prediction models that may be deployed by any computing system and/or computing device disclosed herein. For instance, the one or more prediction models may comprise (1) a first prediction model that may receive mesh data of a given physical element as input and output a prediction of whether the given physical element has a vertical or horizontal orientation, (2) a second prediction model that may receive mesh data of a given physical element as input and output a prediction of whether the given physical element has a cylindrical shape, (3) a third prediction model that may receive mesh data of a given physical element as input and output a prediction of whether the given physical element has a flat shape, and/or (4) a fourth prediction model that may receive mesh data of a given physical element as input and output a prediction of whether the given physical element has a long shape, among other possibilities.

In one implementation, a given predictive model described above may take the form of a supervised classification model. The supervised classification model may take various forms, examples of which may include a random forest model, a decision tree model, gradient-boosted tree model (such as those implemented using the XGBoost library), a Naive Bayes model, and a logistic regression model, as some non-limiting examples. The given predictive model may take various other forms as well (including but not limited to an unsupervised model).

Prior to deploying the one or more predictive models described above, a computing system and/or computing device disclosed herein may define the one or more predictive models in any of various manners, which may depend at least in part on the form of the one or more predictive models. For instance, as one possibility, the computing system and/or computing device may define a given predictive model by applying a machine-learning technique to labeled, historical data that is similar in form to the given model's input data, such as historical mesh data that is available to the computing system and/or computing device. The computing system and/or computing device may define a given predictive model in other manners as well.

Figure 2:
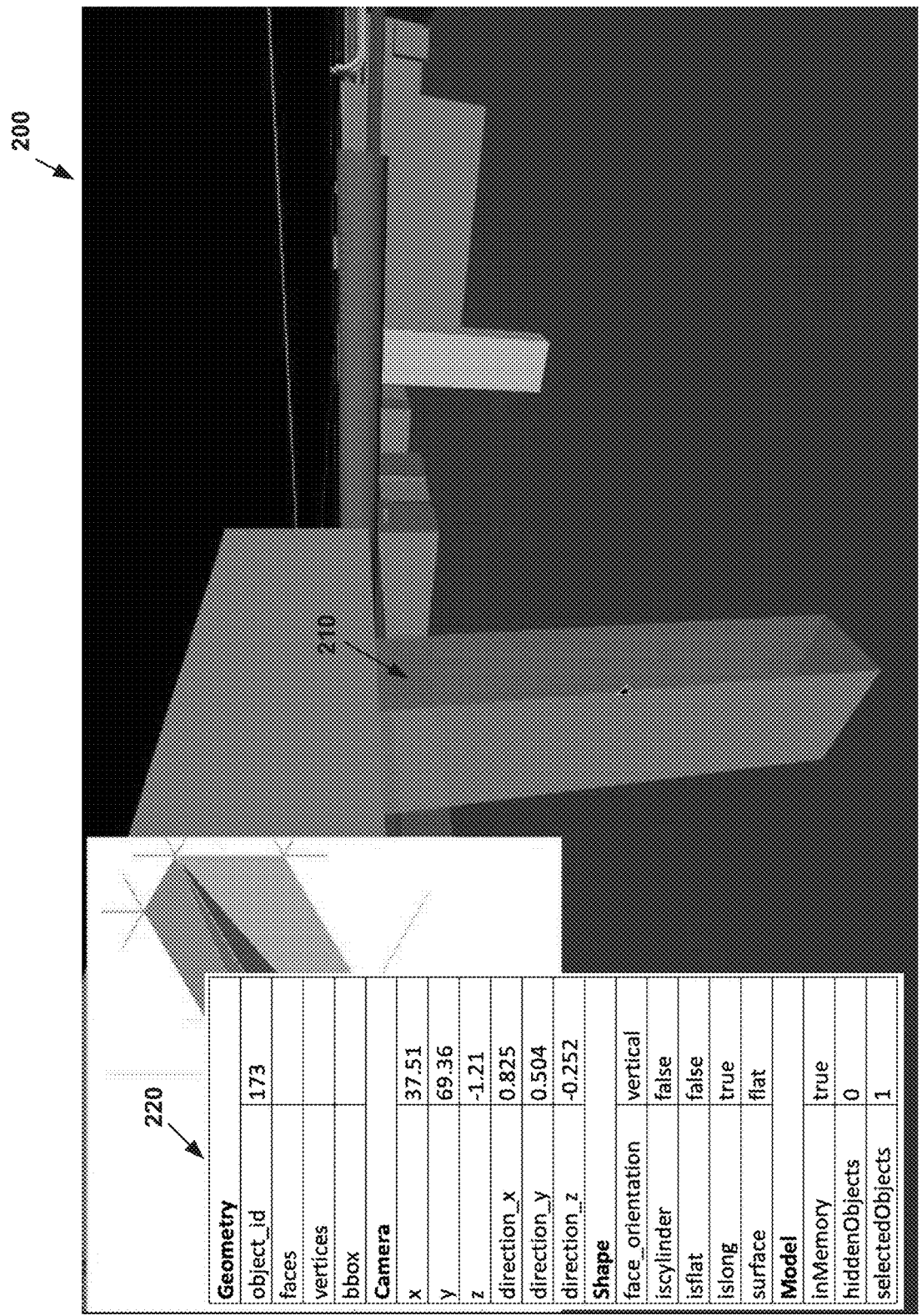
FIG. 2 depicts an example 3D model of a construction project in accordance with the present disclosure.

Turning to FIG. 2, an example 3D model 200 of a construction project is depicted (which may be a 3D model of the same construction project depicted in FIG. 1). As shown, 3D model 200 may include various individual physical elements, such as physical element 210 that may represent a given pillar that supports a building being constructed.

3D model 200 may also include data 220 that is associated with physical element 210. In particular, data 220 may include data describing physical element 210, such as data describing the size, position, and/or shape of physical element 210. For instance, as shown, data 220 includes a set of coordinates (e.g., an x-coordinate, a y-coordinate, and a z-coordinate) for physical element 210. Data 220 also includes shape data comprising (1) data indicating that physical element 210 has a vertical orientation (as indicated by a "face_orientation" field that is set to "vertical"), (2) data indicating that physical element 210 does not have a cylinder shape (as indicated by a "iscylinder" field that is set to "false"), (3) data indicating that physical element 210 does not have a flat shape (as indicated by a "isflat" field that is set to "false"), (4) data indicating that physical element 210 has a long shape (as indicated by a "islong" field that is set to "true"), and (5) data indicating that physical element 210 has a flat surface (as indicated by a "surface" field that is set to "flat"). Data 220 may include various other data describing the size, position, and/or shape of physical element 210 as well.

As described above, it should be understood that data 220 may include additional data for physical element 210 that not be related to its specific size, position, and/or shape.

Further, while only two forms of visual representations of a construction project have been described above (e.g., a 2D model and a 3D model of a construction project), it should be understood that visual representations of a construction project may take various other forms as well.

II. EXAMPLE SYSTEM CONFIGURATION

As noted above, the disclosed AR software application may comprise (1) a first software component that functions to position an AR-enabled device within a virtual 3D model of a real-world environment, (2) a second software component that functions to establish alignment between the virtual 3D model of the real-world environment and the real-world environment, and (3) a third software component that functions to navigate the virtual 3D model of the real-world environment as a user navigates the real-world environment. It should be understood that the disclosed AR software application may comprise more or less software components than the software components noted above.

In one possible implementation, all of the software components of the disclosed AR software application may be running on an AR-enabled device that may be accessible to various users associated with a construction project (e.g., construction professionals). As another possible implementation, the software components of the disclosed AR software application may be distributed between an AR-enabled device and a back-end platform (sometimes referred to as a "cloud" platform) in communication with the AR-enabled device that can interact with and/or drive the software components running on the AR-enabled device. One of ordinary skill in the art will appreciate that the software components of the disclosed AR software application may be running on other computing devices as well, such as a client station in communication with the AR-enabled device and/or the back-end platform.

Further, as noted above, the disclosed insights software application functions to obtain and compare a plurality of 3D models of a real-world environment that are captured at different periods of time from one or more computing devices that are capable of capturing 3D models of a real-world environment, which may include AR-enabled devices and/or other computing devices that are capable of capturing 3D sensor data that provides a 3D model of a real-world environment of interest (e.g., a device equipped with a Light Detection and Ranging ("LiDAR") sensor). In this respect, in one possible implementation, the disclosed insights software application may be running on a back-end platform in communication with AR-enabled devices and/or other computing devices that are capable of capturing 3D models of a real-world environment of interest.

To illustrate one example configuration, FIG. 3 depicts an example system configuration 300 in which example embodiments of the present disclosure may be implemented. As shown in FIG. 3, system configuration 300 includes a back-end platform 302 that may be communicatively coupled to one or more computing devices, such as AR-enabled devices 312A, 312B, and client station 314.

In general, back-end platform 302 may comprise one or more computing systems that have been provisioned with software for carrying out one or more of the functions disclosed herein, such as functions related to the one or more software components described above and/or transmitting data and/or instructions that cause AR-enabled devices 312A, 312B (and/or perhaps client station 314) to output information related to a project (e.g., a construction project), including information related to the rendered view of the real-world environment that has aligned virtual content (e.g., a 2D model or a 3D model) superimposed onto the view of the real-world environment. The one or more computing systems of back-end platform 302 may take various forms and be arranged in various manners.

For instance, as one possibility, back-end platform 302 may comprise computing infrastructure of a public, private, and/or hybrid cloud (e.g., computing and/or storage clusters) that has been provisioned with software for carrying out one or more of the functions disclosed herein. In this respect, the entity that owns and operates back-end platform 302 may either supply its own cloud infrastructure or may obtain the cloud infrastructure from a third-party provider of "on demand" computing resources, such include Amazon Web Services (AWS) or the like. As another possibility, back-end platform 302 may comprise one or more dedicated servers that have been provisioned with software for carrying out one or more of the functions disclosed herein. Other implementations of back-end platform 302 are possible as well.

In turn, AR-enabled device 312A and/or AR-enabled device 312B may be capable of running some or all of the software components of the disclosed AR software application. In this respect, AR-enabled device 312A and/or AR-enabled device 312B may include various hardware components, such as a processor, data storage, a user interface, and a network interface, among others, as well as the software components that facilitate the AR-enabled device's ability to run the software components (e.g., operating system software). As representative examples, AR-enabled device 312A and/or AR-enabled device 312B may take the form of a wearable device (e.g. head-mounted display) or any other computing device with AR capabilities (e.g., a laptop, a netbook, a tablet, a smartphone, etc.).

As indicated by the dashed lined in FIG. 1, client station 314 may optionally communicate with back-end platform 302, AR-enabled device 312A and/or AR-enabled device 312B, and may be may be capable of running one or more software components of the disclosed AR software application and/or the disclosed insights software application. In this respect, client station 314 may also include various hardware components, such as a processor, data storage, a user interface, and a network interface, among others, as well as software that facilitates the client station's ability to run the software components (e.g., operating system software). As representative examples, client station 314 may take the form of a desktop computer, a laptop, a netbook, a tablet, a smartphone, and/or a personal digital assistant (PDA), among other possible computing devices, some of which may or may not have AR capabilities.

As further depicted in FIG. 3, back-end platform 302, AR-enabled device 312A, AR-enabled device 312B, and/or client station 314 are configured to interact with one another over respective communication paths. For instance, the communication path with back-end platform 302 may generally comprise one or more communication networks and/or communications links, which may take any of various forms. For instance, each respective communication path with back-end platform 302 may include any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the communication networks and/or links that make up each respective communication path with back-end platform 302 may be wireless, wired, or some combination thereof, and may carry data according to any of various different communication protocols. Although not shown, the respective communication paths with back-end platform 302 may also include one or more intermediate systems. For example, it is possible that back-end platform 302 may communicate with AR-enabled device 312A, AR-enabled device 312B and/or client station 314 via one or more intermediary systems, such as a host server (not shown). Many other configurations are also possible.

Similarly, the optional communication path between AR-enabled device 312A (and/or AR-enabled device 312B) and client station 314 may generally comprise one or more communication networks and/or communications links, which may also take various forms. For instance, the communication path between AR-enabled device 312A (and/or AR-enabled device 312B) and client station 314 may include any one or more of point-to-point links, PANs, and LANs, among other possibilities. Further, the communication networks and/or links that make up the communication path between AR-enabled devices 312A, 312B and client station 314 may be wireless, wired, or some combination thereof, and may carry data according to any of various different communication protocols. Many other configurations are also possible.

Generally speaking, the interaction between AR-enabled device 312A (and/or AR-enabled device 312B) and back-end platform 302 may take various forms. As one possibility, AR-enabled device 312A and/or AR-enabled device 312B may send certain data related to a construction project to back-end platform 302, such as user input, sensor data captured by AR-enabled device 312A and/or AR-enabled device 312B, and/or other data generated by the software components running on AR-enabled device 312A and/or AR-enabled device 312B, which may in turn trigger back-end platform 302 to take one or more actions based on the data. As another possibility, AR-enabled device 312A and/or AR-enabled device 312B may send a request to back-end platform 302 for certain data (e.g., rendered 2D or 3D models of a construction project) and/or a certain front-end software module, and AR-enabled device 312A and/or AR-enabled device 312B may then receive the data (and perhaps related instructions) from back-end platform 302 in response to such a request. As yet another possibility, back-end platform 302 may be configured to "push" certain types of data to AR-enabled device 312A and/or AR-enabled device 312B, such as rendered 3D models, in which case AR-enabled device 312A and/or AR-enabled device 312B may receive such data (and perhaps related instructions) from back-end platform 302 in this manner. As still another possibility, back-end platform 302 may be configured to make certain types of data available via an API, a service, or the like, in which case AR-enabled device 312A and/or AR-enabled device 312B may receive such data from back-end platform 302 by accessing such an API or subscribing to such a service. The interaction between AR-enabled device 312A (and/or AR-enabled device 312B) and back-end platform 302 may take various other forms as well.

It should be understood that the interaction between client station 314, back-end platform 302, AR-enabled device 312A and/or AR-enabled device 312B may take various forms similar to the forms described above.

Although not shown in FIG. 3, back-end platform 302 may also be configured to receive data, such as data related to a construction project, from one or more external data sources, such as an external database and/or another back-end platform or platforms. Such data sources—and the data output by such data sources—may take various forms.

III. EXAMPLE PLATFORM

Figure 4A:
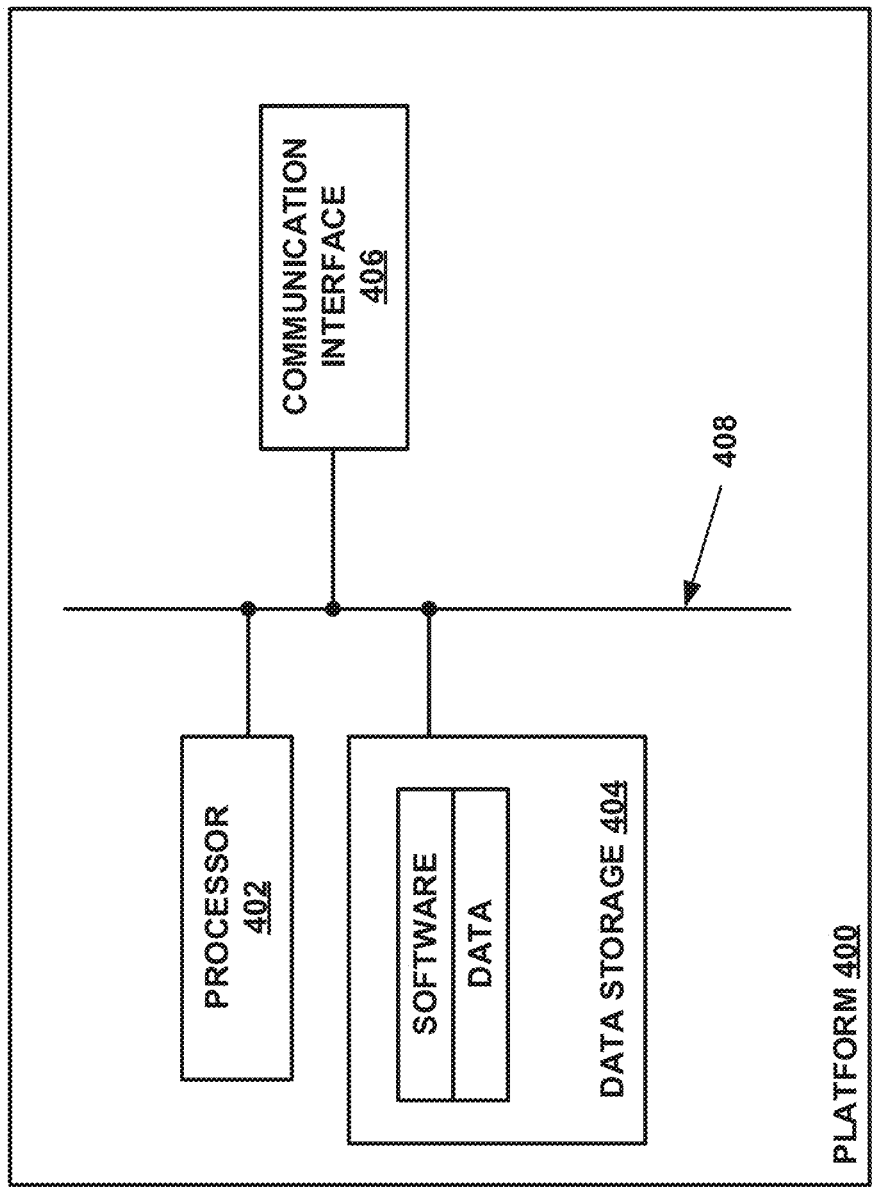
FIG. 4A depicts an example computing platform that may be configured to carry out one or more of the functions of the present disclosure.

FIG. 4A is a simplified block diagram illustrating some structural components that may be included in an example computing platform 400, which could serve as back-end platform 302 of FIG. 3. In line with the discussion above, platform 400 may generally comprise one or more computer systems (e.g., one or more servers), and these one or more computer systems may collectively include at least a processor 402, data storage 404, and a communication interface 406, all of which may be communicatively linked by a communication link 408 that may take the form of a system bus, a communication network such as a public, private, or hybrid cloud, or some other connection mechanism.

Processor 402 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 402 could comprise processing components that are distributed across a plurality of physical computing devices connected via a network, such as a computing cluster of a public, private, or hybrid cloud.

As shown in FIG. 4A, data storage 404 may be provisioned with software components that enable the platform 400 to carry out the functions disclosed herein. These software components may generally take the form of program instructions that are executable by the processor 402 to carry out the disclosed functions, which may be arranged together into software applications, virtual machines, software development kits, toolsets, or the like. Further, data storage 404 may be arranged to store data in one or more databases, file systems, or the like. Data storage 404 may take other forms and/or store data in other manners as well.

Communication interface 406 may be configured to facilitate wireless and/or wired communication with external data sources, client stations, and/or AR-enabled devices (such as AR-enabled device 312A and/or AR-enabled device 312B) and client station 314 in FIG. 3. Additionally, in an implementation where platform 400 comprises a plurality of physical computing devices connected via a network, communication interface 406 may be configured to facilitate wireless and/or wired communication between these physical computing devices (e.g., between computing and storage clusters in a cloud network). As such, communication interface 406 may take any suitable form for carrying out these functions, examples of which may include an Ethernet interface, a serial bus interface (e.g., Firewire, USB 3.0, etc.), a chipset and antenna adapted to facilitate wireless communication, and/or any other interface that provides for wireless and/or wired communication. Communication interface 406 may also include multiple communication interfaces of different types. Other configurations are possible as well.

Although not shown, platform 400 may additionally include one or more interfaces that provide connectivity with external user-interface equipment (sometimes referred to as "peripherals"), such as a keyboard, a mouse or track-pad, a display screen, a touch-sensitive interface, a stylus, speakers, etc., which may allow for direct user interaction with platform 400.

It should be understood that platform 400 is one example of a computing platform that may be used with the embodiments described herein. Numerous other arrangements are possible and contemplated herein. For instance, other computing platforms may include additional components not pictured and/or more or less of the pictured components.

IV. EXAMPLE AR-ENABLED DEVICE

Figure 4B:
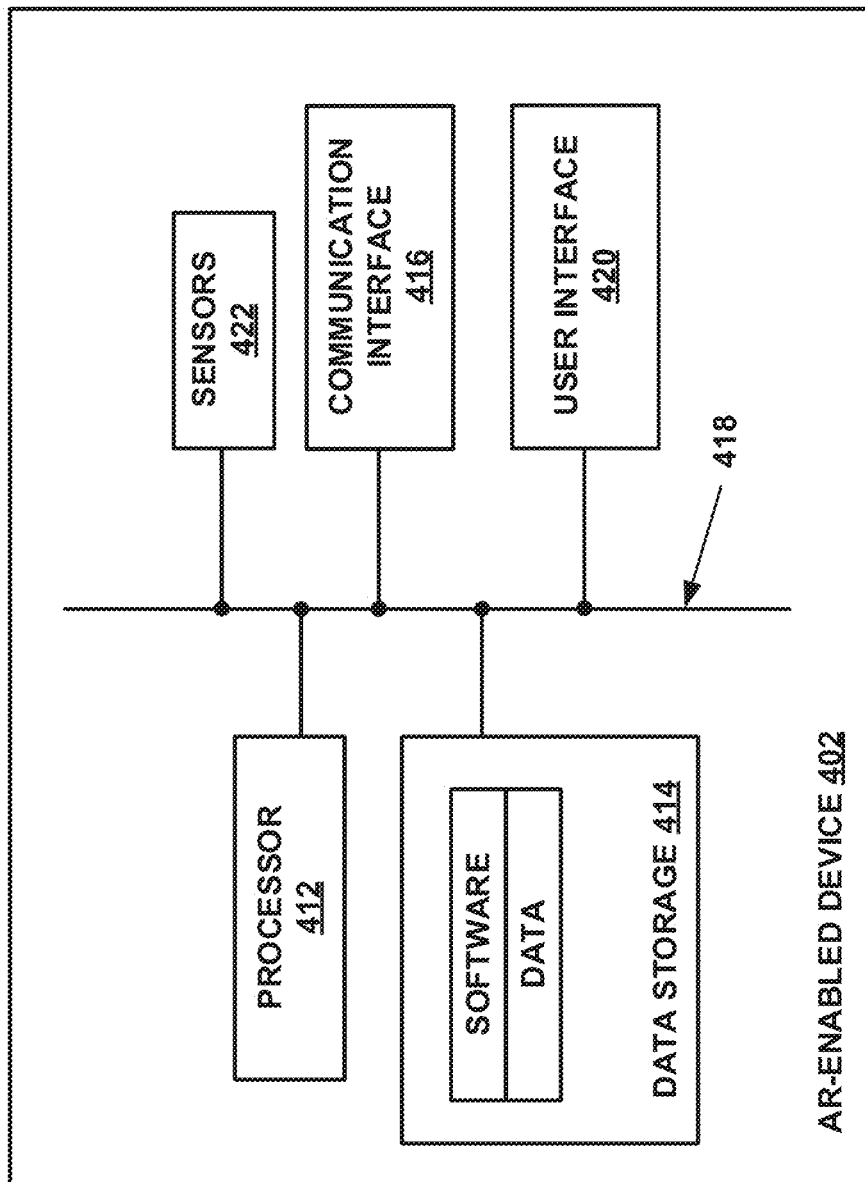
FIG. 4B depicts an example AR-enabled device that may be configured to carry out one or more of the functions of the present disclosure.

FIG. 4B is a simplified block diagram illustrating some structural components that may be included in an example AR-enabled computing device 402, which could serve as AR-enabled device 312A and/or AR-enabled device 312B of FIG. 3.

AR-enabled computing device 402 may generally comprise a processor 412, data storage 414, communication interface 416, user interface 420, and sensors 422, all of which may be communicatively linked by a communication link 418 that may take the form of a system bus or some other connection mechanism. In line with the discussion above, AR-enabled computing device 402 may take various forms, examples of which may include a wearable device, a laptop, a netbook, a tablet, and/or a smartphone, among other possibilities.

Processor 412 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed.

In turn, data storage 414 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc.

As shown in FIG. 4B, data storage 414 may be provisioned with software components that enable AR-enabled computing device 402 to carry out functions disclosed herein. These software components may generally take the form of program instructions that are executable by processor 412 to carry out the disclosed functions, which may be arranged together into software applications, virtual machines, software development kits, toolsets, or the like. Further, data storage 414 may be arranged to store data in one or more databases, file systems, or the like. Data storage 414 may take other forms and/or store data in other manners as well.

Communication interface 416 may be configured to facilitate wireless and/or wired communication with another network-enabled system or device, such as back-end platform 302 or client station 314. Communication interface 416 may take any suitable form, examples of which may include an Ethernet interface, a serial bus interface (e.g., Firewire, USB 3.0, etc.), a chipset and antenna adapted to facilitate wireless communication, and/or any other interface that provides for wireless and/or wired communication. Communication interface 416 may also include multiple communication interfaces of different types. Other configurations are possible as well.

User interface 420 may be configured to facilitate user interaction with AR-enabled computing device 402 and may also be configured to facilitate causing AR-enabled computing device 402 to perform an operation in response to user interaction. Examples of user interface 420 include a touch-sensitive interface, mechanical interface (e.g., levers, buttons, wheels, dials, keyboards, etc.), and other input interfaces (e.g., microphones to facilitate voice commands), among other examples. In some cases, user interface 420 may include or provide connectivity to output components, such as display screens, speakers, headphone jacks, and the like.

Sensors 422 may be generally configured to capture data associated with AR-enabled computing device 402. For example, sensors 422 may be used to determine the position and/or orientation of AR-enabled computing device 402. In this respect, sensors 422 may take various forms, examples of which may include an accelerometer, a gyroscope, and/or a GPS unit, among other examples.

Additionally, sensors 422 may be used to capture sensor data that is representative of a real-world environment being perceived by AR-enabled computing device 402. In this respect, as one example, sensors 422 may include one or more cameras that are configured to capture image data that is representative a real-world environment being perceived by AR-enabled computing device 402. As another example, sensors 422 may include a LiDAR sensor that is configured to capture 3D sensor data that is representative of a real-world environment being perceived by AR-enabled computing device 402. To facilitate this functionality, such a LiDAR sensor may emit pulsed light waves (e.g., laser beams) into the real-world environment, detect the returning pulses that reflect off surrounding physical elements in the real-world environment, and then use the time it took for each pulse to return to the LiDAR sensor to determine the distance between the LiDAR sensor of AR-enabled computing device 402 and the surrounding physical elements in the real-world environment. These distance measurements may then be combined with positional information and transformed into 3D points that are representative of the real-world environment, including 3D coordinates of physical elements in the real-world environment. In turn, these 3D points may be used to provide a 3D model of the real-world environment.

In some instances, processor 412 may use sensor data from sensors 422 to determine the position and/or orientation of AR-enabled computing device 402. Processor 412 may also use sensor data from sensors 422 to facilitate establishing alignment between a virtual 3D model of the real-world environment and the real-world environment. In other instances, in line with the discussion above, AR-enabled computing device 402 may transmit sensor data from sensors 422 to another network-enabled system or device that is configured to process the sensor data, such as back-end platform 302 and/or client station 314.

Although not shown, AR-enabled computing device 402 may additionally include one or more interfaces that provide connectivity with external user-interface equipment (sometimes referred to as "peripherals"), such as a keyboard, a mouse or trackpad, a display screen, a touch-sensitive interface, a stylus, speakers, etc., which may allow for direct user interaction with AR-enabled computing device 402.

It should be understood that AR-enabled computing device 402 is one example of a computing device that may be used with the embodiments described herein. Numerous other arrangements are possible and contemplated herein. For instance, other computing devices may include additional components not pictured and/or more or less of the pictured components.

V. EXAMPLE CLIENT STATION

Figure 4C:
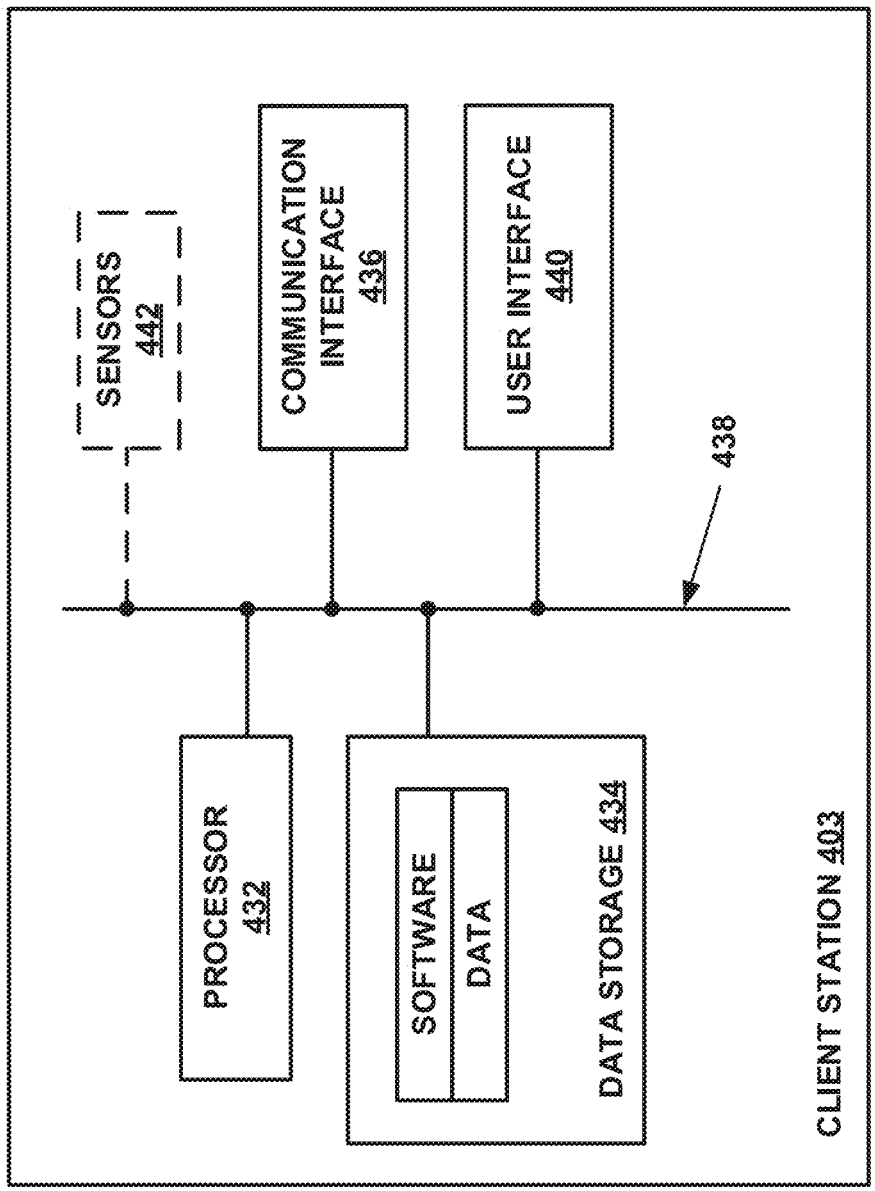
FIG. 4C depicts an example client station that may be configured to carry out one or more of the functions of the present disclosure.

FIG. 4C is a simplified block diagram illustrating some structural components that may be included in an example client station 403, which could serve as client station 314 of FIG. 3. Client station 403 may generally comprise a processor 432, data storage 434, a communication interface 436, user interface 440, and optional sensors 442, all of which may be communicatively linked by a communication link 438 that may take the form of a system bus or some other connection mechanism. In this respect, in line with the discussion above, client station 403 may take various forms, examples of which may include a desktop computer, a laptop, a netbook, a tablet, a smartphone, and/or a personal digital assistant (PDA), among other possibilities.

Processor 432 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed.

In turn, data storage 434 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc.

As shown in FIG. 4C, data storage 434 may be provisioned with software components that enable client station 403 to carry out functions disclosed herein. These software components may generally take the form of program instructions that are executable by processor 432 to carry out the disclosed functions, which may be arranged together into software applications, virtual machines, software development kits, toolsets, or the like. Further, data storage 434 may be arranged to store data in one or more databases, file systems, or the like. Data storage 434 may take other forms and/or store data in other manners as well.

Communication interface 436 may be configured to facilitate wireless and/or wired communication with another network-enabled system or device, such as back-end platform 302 or AR-enabled device 312A and/or AR-enabled device 312B. Communication interface 436 may take any suitable form, examples of which may include an Ethernet interface, a serial bus interface (e.g., Firewire, USB 3.0, etc.), a chipset and antenna adapted to facilitate wireless communication, and/or any other interface that provides for wireless and/or wired communication. Communication interface 436 may also include multiple communication interfaces of different types. Other configurations are possible as well.

User interface 440 may be configured to facilitate user interaction with client station 403 and may also be configured to facilitate causing client station 403 to perform an operation in response to user interaction. Examples of user interface 440 include a touch-sensitive interface, mechanical interface (e.g., levers, buttons, wheels, dials, keyboards, etc.), and other input interfaces (e.g., microphones), among other examples. In some cases, user interface 440 may include or provide connectivity to output components, such as display screens, speakers, headphone jacks, and the like.

Although not shown, client station 403 may additionally include one or more interfaces that provide connectivity with external user-interface equipment (sometimes referred to as "peripherals"), such as a keyboard, a mouse or trackpad, a display screen, a touch-sensitive interface, a stylus, speakers, etc., which may allow for direct user interaction with client station 403.

Sensors 442 may be generally configured to capture data associated with client station 403. For example, sensors 442 may be used to determine the position and/or orientation of client station 403. In this respect, sensors 442 may take various forms, examples of which may include an accelerometer, a gyroscope, and/or a GPS unit, among other examples.

Additionally, sensors 442 may be used to capture sensor data that is representative of a real-world environment being perceived by client station 403. In this respect, as one example, sensors 442 may include one or more cameras that are configured to capture image data that is representative a real-world environment being perceived by client station 403. As another example, sensors 442 may include a LiDAR sensor that is configured to capture 3D sensor data that is representative of a real-world environment being perceived by client station 403.

It should be understood that, in some instances, client station 403 may not include any sensors. In this respect, sensors 442 may be optional.

Further, it should be understood that client station 403 is one example of a computing device that may be used with the embodiments described herein. Numerous other arrangements are possible and contemplated herein. For instance, other computing devices may include additional components not pictured and/or more or less of the pictured components.

VI. EXAMPLE AR APPLICATION

As described above, one aspect of the present disclosure is generally directed to a software application that leverages improved AR technology to facilitate presentation of virtual content overlaid on a view of a real-world environment. At a high level, this disclosed software application may be embodied in the form of an AR software application that comprises (1) a first software component that functions to position an AR-enabled device within a virtual 3D model of a real-world environment, (2) a second software component that functions to establish alignment between the virtual 3D model of the real-world environment and the real-world environment, and (3) a third software component that functions to navigate the virtual 3D model of the real-world environment as a user navigates the real-world environment. Each of these software components will now be described below.

Although example functions of each software component of the disclosed AR software application are described below as being carried out by an AR-enabled device (e.g., AR-enabled device 312A and/or 312B), as noted above, it should be understood that the responsibility for carrying out the functions could be distributed between a back-end platform (e.g., back-end platform 302) and one or more client stations (e.g., client station 314). Further, it should be understood that example functions of each software component are merely described in such manner for the sake of clarity and explanation and that some of the functions may be carried out in various other manners as well, including the possibility that example functions may be added, removed, rearranged into different orders, grouped together, and/or not grouped together at all.

A. Example First Software Component

As noted above, the disclosed AR software application may comprise a first software component that functions to position an AR-enabled device (e.g., AR-enabled device 312A and/or 312B) within a virtual 3D model of a real-world environment. An AR-enabled device (e.g., AR-enabled device 312A and/or 312B) running the first software component may position itself within the virtual 3D model of the real-world environment in various manners.

As one possibility, the AR-enabled device may position itself within the virtual 3D model of the real-world environment by (1) presenting a virtual 2D model of the real-world environment to a user experiencing AR (e.g., a construction professional), (2) receiving user input that indicates a selection of a position and/or orientation within the virtual 2D model of the real-world environment, and (3) translating the selected position and/or orientation within the virtual 2D model to a corresponding position and/or orientation within a virtual 3D model of the real-world environment. The AR-enabled device may carry out these functions in various manners.

For instance, the AR-enabled device may present the virtual 2D model of the real-world environment to the user in various manners. In one example implementation, the AR-enabled device may overlay the virtual 2D model (e.g., 2D model 100 of FIG. 1) onto a given portion of a view of the real-world environment perceived by the user. The given portion of the view may comprise a left portion, a right portion, a top portion, and/or a bottom portion of the view. In some instances, the virtual 2D model may be overlaid onto the entire portion of the view as well.

The AR-enabled device may present the virtual 2D model at various times. As one example, the AR-enabled device may present the virtual 2D model in response to receiving a request to present the virtual 2D model. For instance, the AR-enabled device may receive user input indicating a request to access the virtual 2D model (e.g., 2D model 100 of FIG. 1). The user input may take various forms, such as body language (e.g., a hand gesture, a head gesture, or the like) that may be detected via one or more sensors of the AR-enabled device (e.g., sensors 422 of FIG. 4B), a voice command that may be input via the user interface of the AR-enabled device (e.g., user interface 420 of FIG. 4B), and/or a touch input that may be input via a touch-sensitive interface or mechanical interface of the AR-enabled device (e.g., user interface 420 of FIG. 4B), among other possibilities. In this respect, the user may input a request to access the virtual 2D model at any given time while experiencing AR.

As another example, the AR-enabled device may present the virtual 2D model after a given duration of time has elapsed. For instance, the AR-enabled device may present the virtual 2D model (e.g., 2D model 100 of FIG. 1) if it does not receive any user input for 5 minutes (or some other duration of time greater or less than 5 minutes). In some instances, the user may be able to adjust the given duration of time such that the virtual 2D model is presented after the given duration of time set by the user.

The AR-enabled device may present the virtual 2D model at various other times as well.

Further, the AR-enabled device may receive user input that indicates a selection of a position and/or orientation within the virtual 2D model of the real-world environment in various manners. For instance, the user may select a position and/or orientation within the virtual 2D model (e.g., 2D model 100 of FIG. 1) that is overlaid onto the view of the real-world environment, and the AR-enabled device may then receive user input that indicates the selection of the position and/or orientation within the virtual 2D model. The user may select the position and/or orientation within the virtual 2D model in various manners.

As one example, the user may select the position and/or orientation within the virtual 2D model using body language (e.g., a hand gesture, a head gesture, eye gaze, etc.) that may be detected by one or more sensors of the AR-enabled device (e.g., sensors 422 of FIG. 4B). In one example implementation, the user may select the position within the virtual 2D model (e.g., 2D model 100 of FIG. 1) by pointing (e.g., with one or more fingers) to the position within the virtual 2D model presented to the user, and the user may select the orientation within the virtual 2D model by dragging the user's pointed finger (or fingers) to a given direction in which the user is facing. The AR-enabled device may then receive user input that indicates the selection of the position and/or orientation within the virtual 2D model.

In another example implementation, the user may select the position within the virtual 2D model (e.g., 2D model 100 of FIG. 1) by gazing at the position within the virtual 2D model presented to the user for a given duration of time (e.g., 5 seconds). After the given duration of time has elapsed, the AR-enabled device may receive user input that indicates the position and present an indication to the user that the AR-enabled device is locked into the position (e.g., a cursor overlaid onto the selected position). The user may then select the orientation within the virtual 2D model by moving the user's head (and/or the user's eyes) to a given direction in which the user is facing. The AR-enabled device may then receive user input that indicates the orientation within the virtual 2D model.

One of ordinary skill in the art will appreciate that the user may select the position and/or orientation within the virtual 2D model using various other body language (or a combination of various body language) as well.

Further, the user may select the position and/or orientation within the virtual 2D model in various other manners as well.

As another example, the user may select the position and/or orientation within the virtual 2D model by using a voice command that may be input via the user interface of the AR-enabled device (e.g., user interface 420 of FIG. 4B). For instance, in one example implementation, the user may select the position and/or orientation within the virtual 2D model by using a voice command indicating a given location within the virtual 2D model and/or a given direction in which the user is facing (e.g., "take me to room number one, facing the window.").

As yet another example, the user may select the position and/or orientation within the virtual 2D model by interacting with a touch-sensitive interface and/or a mechanical interface of the AR-enabled device (e.g., user interface 420 of FIG. 4B). For instance, in one example implementation, the AR-enabled device may present a curser that is overlaid on the virtual 2D model, and the user may control the curser using the touch-sensitive interface and/or the mechanical interface of the AR-enabled device in order to select the position within the virtual 2D model, and the user may further interact with the touch-sensitive interface and/or the mechanical interface of the AR-enabled device to select the orientation within the virtual 2D model.

The user may select the position and/or orientation within the virtual 2D model in various other manners as well. For instance, the user may select the position and/or orientation within the virtual 2D model using a combination of body language, one or more voice commands, and/or physical interaction with a touch-sensitive interface and/or a mechanical interface of the AR-enabled device.

After the AR-enabled device receives user input that indicates the selection of the position and/or orientation within the virtual 2D model of the real-world environment, the AR-enabled device may then translate the selected position and/or orientation within the virtual 2D model to a corresponding position and/or orientation within a virtual 3D model of the real-world environment (e.g., 3D model 200 of FIG. 2). The AR-enabled device may carry out this function in various manners.

For example, the AR-enabled device may (1) translate the selected position within the virtual 2D model of the real-world environment into 2D coordinates and translate the selected orientation to a particular orientation angle, and then (2) translate the 2D coordinates and the particular orientation angle into corresponding 3D coordinates and a corresponding orientation angle within the virtual 3D model of the real-world environment. In particular, in one example implementation, the AR-enabled device may translate the selected position within the virtual 2D model of the real-world environment into an x-coordinate positioned along the lateral x-axis of the 2D model and a y-coordinate positioned along the lateral y-axis of the 2D model. Further, the AR-enabled device may translate the selected orientation within the virtual 2D model into a particular orientation angle along the lateral axis. The AR-enabled device may then translate the x-coordinate, the y-coordinate, and/or the particular orientation angle into a corresponding x-coordinate, y-coordinate, and/or orientation angle within the virtual 3D model.

The AR-enabled device may also determine a z-coordinate along a z-axis of the 3D model. In practice, the z-coordinate may be predetermined and may be later aligned to the view of the real-world environment perceived by the user as described in more detail below with reference to the second software component of the disclosed AR software application. However, in some instances, it should be understood that the z-coordinate may be determined based on the vertical height at which the user perceives the view of the real-world environment.

The AR-enabled device may translate the selected position and/or orientation within the virtual 2D model to the corresponding position and/or orientation within the virtual 3D model of the real-world environment in various other manners as well. Further, the AR-enabled device running the first software component may position within the virtual 3D model of the real-world environment in various other manners as well.

As another possibility, the AR-enabled device may position itself within the virtual 3D model of the real-world environment based on a voice command that may be input via the user interface of the AR-enabled device (e.g., user interface 420 of FIG. 4B). The voice command may take various forms For instance, in one example implementation, the user may select a position and/or orientation within the virtual 3D model by using a voice command indicating a given location within the virtual 3D model and/or a given direction in which the user is facing (e.g., "I am facing the east wall of room number one."). The AR-enabled device may then receive the voice command, translate the voice command into a position and/or orientation within the virtual 3D model, and then position itself within the virtual 3D model of the real-world environment based on the translation. The voice command may take various other forms as well.

In practice, the AR-enabled device may position itself within the virtual 3D model of the real-world environment based on a voice command when the user has some awareness as to where the user is located and/or oriented within the real-world environment. In this respect, the AR-enabled device may position itself within the virtual 3D model of the real-world environment without the need to first present a virtual 2D model of the real-world environment to the user.

As yet another possibility, the AR-enabled device may position itself within the virtual 3D model of the real-world environment based on one or more objection recognition techniques. For instance, in one example implementation, the AR-enabled device may position itself within the virtual 3D model of the real-world environment by (1) detecting one or more objects in a portion of the view of the real-world environment being perceived by the user from the user's position and/or orientation, (2) comparing the detected one or more objects to data associated with the virtual 3D model (e.g., data that describes individual physical elements of the real-world environment and the relationships between these individual physical elements), and (3) based on the comparison, determining a position and/or orientation within the virtual 3D model that corresponds to the user's position and/or orientation.

The AR-enabled device may detect the one or more objects in the portion of the view of the real-world environment in various manners. For example, the user may direct the AR-enabled device to the view of the real-world environment and gaze at the view for a given duration of time. The AR-enabled device may then detect the one or more objects (e.g., a ceiling, a floor, a wall, a pillar, etc.) in a portion of the view.

The AR-enabled device may detect the one or more objects in the portion of the view of the real-world environment in various other manners as well. As another example, the AR-enabled device may receive user input indicating a request to detect the one or more objects in the portion of the view of the real-world environment. The user input may take various forms described above, such as body language (e.g., a hand gesture, a head gesture, etc.), a voice command, and/or a touch input, among other possibilities.

After detecting the one or more objects in the portion of the view of the real-world environment being perceived by the user from the user's position and/or orientation, the AR-enabled device may compare the one or more detected objects to data associated with the virtual 3D model. For instance, the AR-enabled device may compare the detected one or more objects to the data describing individual physical elements of the real-world environment and the relationships between these individual physical elements. As described above, this data may comprise data related to the size, position, and/or shape of each individual physical element in the virtual 3D model, among other types of data. The AR-enabled device may compare the one or more detected objects to such data in various manners.

In one example implementation, to reduce processing time, the AR-enabled device may identify a subset of individual physical elements included in the virtual 3D model, and then compare data describing each individual physical element in the subset (e.g., size, position, and/or shape-related data) to each detected object in the portion of the view of the real-world environment. For instance, the AR-enabled device may identify a subset of individual physical elements that are near where the AR-enabled device is positioned within the 3D model, and then compare data describing each individual physical element in the subset (e.g., size, position, and/or shape-related data) to each detected object in the portion of the view of the real-world environment. The AR-enabled device may then identify one or more individual physical elements that correspond to the one or more detected objects in the portion of the view of the real-world environment.

In another example implementation, the AR-enabled device may compare data describing each individual physical element in the virtual 3D model (e.g., size, position, and/or shape related-data) to each detected object in the portion of the view of the real-world environment, regardless of where the AR-enabled device is positioned within the 3D model. The AR-enabled device may then identify one or more individual physical elements that correspond to the one or more detected objects in the portion of the view of the real-world environment.

The AR-enabled device may compare the one or more detected objects to data associated with the virtual 3D model (e.g., data describing individual physical elements of the real-world environment and the relationships between these individual physical elements) in various other manners as well.

Based on the comparison, the AR-enabled device may determine the position and/or orientation within the virtual 3D model that corresponds to the user's position and/or orientation. For instance, based on (1) the position and/or orientation of each detected object in the portion of the view of the real-world environment and (2) each identified individual physical element that corresponds to a respective detected object, the AR-enabled device may determine the position and/or orientation within the virtual 3D model of the real-world environment relative to the view of the real-world environment that is perceived by the user from the user's position and/or orientation.

The AR-enabled device running the first software component may position itself within the virtual 3D model of the real-world environment in various other manners as well.

B. Example Second Software Component

As noted above, the disclosed AR software application may comprise a second software component that functions to establish alignment between the virtual 3D model of the real-world environment and the real-world environment. An AR-enabled device (e.g., AR-enabled device 312A and/or 312B) running the second software component may establish alignment between the virtual 3D model of the real-world environment and the real-world environment in various manners.

As one possibility, after positioning itself within the virtual three-dimensional model of the real-world environment, the AR-enabled device may establish alignment between the virtual 3D model of the real-world environment and the real-world environment based on an objection recognition technique. For instance, the AR-enabled device may (1) detect one or more objects in a portion of the view of the real-world environment being perceived by the user from the user's position and/or orientation, (2) compare the one or more detected objects to data associated with the virtual 3D model (e.g., data that describes individual physical elements of the real-world environment and the relationships between these individual physical elements), and (3) based on the comparison, align one or more individual physical elements in the virtual 3D model with respective one or more detected objects in the portion of the view of the real-world environment being perceived by the user from the user's position and/or orientation.

It should be understood that the AR-enabled device may detect the one or more objects in the portion of the view of the real-world environment and compare the one or more detected objects to data associated with the virtual 3D model in various manners described above.

Based on the comparison, the AR-enabled device may then align one or more individual physical elements in the virtual 3D model with the respective one or more detected objects in the portion of the view of the real-world environment being perceived by the user from the user's position and/or orientation. For instance, based on the comparison, the AR-enabled device may then identify one or more individual physical elements (e.g., physical element 210 of FIG. 2) that correspond to the one or more detected objects in the portion of the view of the real-world environment (e.g., a given pillar in a building being constructed), and align each individual physical element to a respective detected object in the portion of the view of the real-world environment.

The AR-enabled device may establish alignment between the virtual 3D model of the real-world environment and the real-world environment in various other manners as well.

As another possibility, after positioning itself within the virtual 3D model of the real-world environment, the AR-enabled device may (1) present an anchor that may be overlaid onto a portion of the view of the real-world environment being perceived by the user from the user's position and/or orientation, (2) receive user input indicating placement of the anchor at a given position and/or orientation relative to the view of the real-world environment, (3) based on the received user input, adjust the presentation of the virtual 3D model to establish alignment between the virtual 3D model and the real-world environment. The anchor may then provide a common frame of reference and stay at the position and/or orientation at which it has been placed as the user navigates the real-world environment.

It should be understood that the anchor that may be placed may take various forms, examples, of which may include an image anchor, a plane anchor (e.g., a horizontal plane or a vertical plane), and/or an object anchor, among other possible examples. It should also be understood that, in some instances, the anchor may be adjustable.

As one particular example, the AR-enabled device may (1) present an adjustable virtual plane that may be overlaid onto a portion of the view of the real-world environment being perceived by the user from the user's position/orientation, (2) receive user input indicating a size, position, and/or orientation of the virtual plane that corresponds to a size, position, and/or orientation of a given object (e.g., a floor) in the view of the real-world environment, (3) based on the received user input, adjust the presentation of the virtual 3D model to establish alignment between the virtual 3D model and the real-world environment.

The AR-enabled device may present the adjustable virtual plane that may be overlaid onto the portion of the view of the real-world environment in various manners, which may depend on the form of the adjustable virtual plane. Generally speaking, the adjustable virtual plan may take the form of a rectangular plane, a circular plane, a triangular plane, or possibly some other shape. Further, the adjustable virtual plane can be overlaid onto any given portion of the view of the real-world environment, such as a top portion, a bottom portion, a left portion, and/or a right portion.

After presenting the adjustable virtual plane, a user may input an indication to adjust the size, position, and/or orientation of the adjustable virtual plane based on the size, position, and/or orientation of a given object (e.g., a floor) in the view of the real-world environment perceived by the user from the user's position and/or orientation. The user input may take various forms described above, including body language (e.g., a hand gesture, a head gesture, etc.), a voice command (e.g., "rotate the adjustable virtual plane 45 degrees."), and/or a touch input, among other possibilities.

The AR-enabled device may then receive the user input indicating the size, position, and/or orientation of the adjustable virtual plane that corresponds to the size, position, and/or orientation of the given object (e.g., a floor) in the view of the real-world environment. One or ordinary skill in the art will appreciate that the AR-enabled device may receive the user input at various times, such as each time the user interacts with the user interface of the AR-enabled device (e.g., user interface 420 of FIG. 4B) and/or each time the AR-enabled device detects a body language via its sensors (e.g., sensors 422 of FIG. 4B).

In turn, based on the received user input, the AR-enabled device may establish alignment between the virtual 3D model and the real-world environment. The AR-enabled device may establish alignment between the virtual 3D model and the real-world environment in various manners.

For instance, AR-enabled device may establish alignment between the virtual 3D model and the real-world environment by updating the position and/or orientation of the AR-enabled device to align with virtual 3D model. AR-enabled device may also adjust the presentation of the virtual 3D model. For instance, based on the size, position, and/or orientation of the adjustable virtual plane that corresponds to the size, position, and/or orientation of the given object (e.g., a floor) in the view of the real-world environment, AR-enabled device 312 may adjust the presentation of the virtual 3D model to establish alignment between the virtual 3D model and the real-world environment.

It should be understood that the AR-enabled device may establish alignment between the virtual 3D model of the real-world environment and the real-world environment using various other types of anchors. It should also be understood that the AR-enabled device may establish alignment between the virtual 3D model of the real-world environment and the real-world environment in various other manners as well.

Further, in some instances, the AR-enabled device may send, to back-end platform 302, information about an anchor that has been used to establish alignment between the virtual 3D model of the real-world environment and the real-world environment. Back-end platform 302 may then store the information about the anchor in a given data store (e.g., data storage 404, or some other physical datastore located outside of back-end platform 302), such that any user of the disclosed AR software application can access the anchor to establish alignment between the virtual 3D model of the real-world environment and the real-world environment.

C. Example Third Software Component

As noted above, the disclosed AR software application may comprise a third software component that functions to navigate the virtual 3D model of the real-world environment as the user navigates the real-world environment. The user experiencing AR may navigate the real-world environment in various manners.

As one example, in instances where the AR-enabled device (e.g., AR-enabled device 312A and/or 312B) comprises a head-mounted display, the user may navigate the real-world environment by looking around the real-world environment (e.g., by tilting the user's head and/or gazing at a particular direction). As another example, the user may navigate the real-world environment by walking around the real-world environment such that the AR-enabled device moves in a given direction. The user may navigate the real-world environment in various other manners as well.

In any case, as the user navigates the real-world environment, the user may perceive a view of the real-world environment from a different position and/or orientation. Accordingly, the AR-enabled device (e.g., AR-enabled device 312A and/or 312B) running the third software component may navigate the virtual 3D model of the real-world environment in order to update the alignment between the virtual 3D model and the view of the real-world environment. The AR-enabled device running the third software component may navigate the virtual 3D model of the real-world environment as the user navigates the real-world environment in various manners.

As one possibility, the AR-enabled device may navigate the virtual 3D model of the real-world environment based on various markerless AR techniques. For instance, the AR-enabled device may (1) detect user movement (e.g., via the AR-enabled device's sensors) and (2) update the presentation of the virtual 3D model in accordance with the detected user movement in order to keep the presentation of the virtual 3D model aligned with the real-world environment.

In one particular example, the AR-enabled device may detect user movement via one or more sensors (e.g., sensors 422 of FIG. 4B) as the user navigates the real-world environment. The AR-enabled device may then receive sensor data and determine an updated position and/or orientation within the 3D model of the real-world environment that corresponds to a view of the real-world environment perceived by the user from the user's updated position and/or orientation relative to a given plane, where the updated position relative to the given plane is represented in terms of a "translation vector" and the updated orientation relative to the given plane is represented in terms of a "rotation matrix." The rotation matrix may comprise a 3-by-3 matrix and may be determined using samples from the AR-enabled device's sensors (e.g., accelerometer), and the translation vector may be determined using 2D tracking of the relative movement of points between consecutive frames as the user navigates from one area of the real-world environment to another. The AR-enabled device may then use the rotation matrix and the translation vector to determine the updated position and/or orientation within the 3D model of the real-world environment.

The AR-enabled device may determine the updated position and/or orientation within the 3D model of the real-world environment using various other markerless AR techniques (or a combination of such techniques) as well, such as Simultaneous Localisation and Mapping ("SLAM"), Parallel Tracking and Mapping (PTAM), and/or GPS-based tracking, among other techniques.

The AR-enabled device running the third software component may navigate the virtual 3D model of the real-world environment as the user navigates the real-world environment in various other manners as well.

As another possibility, the AR-enabled device may navigate the virtual 3D model of the real-world environment using one or more object recognition techniques (and/or an anchor, such as an adjustable virtual plane described above with reference to the second software component) in order to re-establish alignment between the virtual 3D model and the real-world environment. For instance, the AR-enabled device may (1) detect one or more objects in a portion of an updated view of the real-world environment being perceived by the user from the user's position and/or orientation, (2) compare the one or more detected objects to data associated with the virtual 3D model (e.g., data that describes individual physical elements of the real-world environment and the relationships between these individual physical elements), and (3) based on the comparison, align one or more individual physical elements in the virtual 3D model with respective one or more detected objects in the portion of the updated view of the real-world environment being perceived by the user from the user's position and/or orientation.

Further in practice, the AR-enabled device may transition from navigating the virtual 3D model based on a given markerless AR technique to navigating the virtual 3D model based on an objection recognition technique (and/or an anchor, such as an adjustable virtual plane) at various times. For example, the AR-enabled device may transition from navigating the virtual 3D model based on the given markerless AR technique to navigating the virtual 3D model based on the objection recognition technique (and/or an anchor, such as an adjustable virtual plane) after the user moves a threshold distance away from where the AR-enabled device was previously positioned within the virtual 3D model. As another example, the AR-enabled device may transition from navigating the virtual 3D model based on the given markerless AR technique to navigating the virtual 3D model based on the objection recognition technique (and/or an anchor, such as an adjustable virtual plane) after a given duration of time has elapsed since the time the user started navigating the real-world environment. As still another example, the AR-enabled device may transition from navigating the virtual 3D model based on the given markerless AR technique to navigating the virtual 3D model based on the objection recognition technique (and/or an anchor, such as an adjustable virtual plane) in response to receiving user input for re-establishing alignment between the virtual 3D model and the real-world environment. The user input may take various forms described above, such as body language, a voice command, and/or a touch input, among other possibilities.

The AR-enabled device running the third software component may navigate the virtual 3D model of the real-world environment as the user navigates the real-world environment in various other manners as well.

D. Facilitating User Interaction with the Virtual 3D Model

In accordance with the present disclosure, while the AR-enabled device (e.g., AR-enabled device 312A and/or 312B) navigates the virtual 3D model of the real-world environment as the user navigates the real-world environment, the AR-enabled device may facilitate user interaction with the virtual 3D model. Generally speaking, as the user navigates the real-world environment (and correspondingly, the AR-enabled device navigates the virtual 3D model), the virtual 3D model overlaid onto the real-world environment may visually communicate to the user various aspects about the real-world environment (e.g. the construction site for the construction project). For instance, the virtual 3D model overlaid onto the real-world environment may visually communicate what objects have been assembled in the real-world environment and/or the manner in which a particular object in the real-world environment has been assembled. In this respect, the virtual 3D model overlaid onto the real-world environment may visually communicate the differences (and/or similarities) between the virtual 3D model overlaid onto the real-world environment and the real-world environment. Based on the virtual 3D model overlaid onto the real-world environment, the AR-enabled device may then facilitate user interaction with the virtual 3D model in various manners.

As one example, based on the virtual 3D model overlaid onto the real-world environment, the AR-enabled device may facilitate the creation and/or revision of plans for carrying out the construction project. For instance, the AR-enabled device may facilitate the creation and/or revision of written statements that communicate issues associated with the construction project (e.g., missing parts, installation issues, etc.).

As another example, based on the virtual 3D model overlaid onto the real-world environment, the AR-enabled device may facilitate completion of various tasks associated with the construction project. For instance, AR-enabled device 312 may facilitate measurement and/or installation of certain parts for the construction project.

As yet another example, as the AR-enabled device navigates the virtual 3D model of the real-world environment (as the user navigates the real-world environment), the AR-enabled device may detect an object in the real-world environment that may not be represented in the virtual 3D model. For instance, in the context of a construction project, the AR-enabled device may detect an object (e.g., a duct, pipe, etc.) that may have been added to the construction project as part of a request (e.g., a change request to add the object during construction), and thus, may not be represented in the virtual 3D model that may have been created before the request.

As described above, the AR-enabled device may detect the object in various manners. For example, the user may direct the AR-enabled device to the view of the real-world environment and gaze at the view for a given duration of time. The AR-enabled device may then detect the object in a portion of the view. As another example, the AR-enabled device may receive user input indicating a request to detect the object in the portion of the view of the real-world environment. The user input may take various forms described above, such as body language (e.g., a hand gesture, a head gesture, etc.), a voice command, and/or a touch input, among other possibilities. The AR-enabled device may detect the object in various other manners as well.

In instances where the AR-enabled device detects an object in the real-world environment that may not be represented in the virtual 3D model, the AR-enabled device may enable the user to "tag" the detected object. Generally speaking, a detected object in the real-world environment that may not be represented in the virtual 3D model may be tagged in order to describe the detected object and later add the detected object to an updated version of the virtual 3D model that includes the detected object, such that the next time the AR-enabled device renders and navigates the updated version of the virtual 3D model of the real-world environment (as the user navigates the real-world environment), the detected object is represented in the virtual 3D model. A tag that may be placed on a detected object may take various forms, such as a rectangular tag, a circular tag, a triangular tag, or possibly some other shape, and the tag may take various sizes.

The tag may also be placed on the detected object in various manners. For example, the AR-enabled device may (1) present a tag that may be overlaid onto the view of the real-world environment, and (2) receive user input indicating placement of the tag onto a detected object in the view, which may take various forms described above, such as body language (e.g., a hand gesture, a head gesture, etc.), a voice command, and/or a touch input, among other possibilities. As another example, the AR-enabled device may detect an object in the view of the real-world environment and automatically tag the detected object. The tag may be placed on the detected object in various other manners as well.

In turn, the AR-enabled device 312 may send, to back-end platform 302, information about the tag that has been placed on the detected object. Back-end platform 302 may then store the information about the tag in a given data store (e.g., data storage 404, or some other physical datastore located outside of back-end platform 302).

AR-enabled device 312 may facilitate user interaction with the virtual 3D model in various other manners as well.

VII. EXAMPLE INSIGHTS SOFTWARE APPLICATION

As noted above, also disclosed herein is an "insights" software application that functions to (i) obtain, from one or more computing devices (including but not limited to AR-enabled devices that are provisioned with the disclosed AR software application), a plurality of 3D models of a real-world environment that represent the real-world environment at different periods of time, (ii) compare the obtained plurality of 3D models of the real-world environment, and then (iii) based on the comparison, provide insights about the real-world environment (e.g., insights about how the construction project is progressing). The back-end platform (e.g., back-end platform 302) that may be in communication with one or more computing devices (e.g., AR-enabled device 312A, AR-enabled device 312B, and/or client station 314) may be configured to perform these functions in various manners.

For instance, back-end platform 302 may obtain, from one or more computing devices (e.g., AR-enabled device 312A, AR-enabled device 312B, and/or client station 314), a plurality of 3D models of a real-world environment that represent the real-world environment at different periods of time in various manners.

As one possibility, the one or more computing devices may each (1) capture, via a respective LiDAR sensor, 3D sensor data that is representative of a real-world environment at a given period of time, and (2) process the captured 3D sensor data to construct a 3D model of the real-world environment. Back-end platform 302 may then obtain each processed 3D model of the real-world environment that represent the real-world environment at a given period of time.

As another possibility, the one or more computing devices may each capture, via a respective LiDAR sensor, 3D sensor data that is representative of a real-world environment at a given period of time. Back-end platform 302 may then obtain the 3D sensor data that was captured from each of the one or more computing devices and process the obtained 3D sensor data to construct a plurality of 3D models of the real-world environment that represent the real-world environment at different periods of time.

back-end platform 302 may obtain the plurality of 3D models of a real-world environment that represent the real-world environment at different periods of time in various other manners as well.

It should be understood that back-end platform 302 may obtain the plurality of 3D models of a real-world environment at various times. For instance, back-end platform 302 may obtain the plurality of 3D models of a real-world environment from the one or more computing devices periodically (e.g., daily, weekly, monthly, etc.) or in response to some form of user input.

After obtaining the plurality of 3D models of the real-world environment that represent the real-world environment at different periods of time, back-end platform 302 may compare the obtained plurality of 3D models of the real-world environment with one another to identify differences (and/or similarities) between each 3D model of the real-world environment. Back-end platform 302 may compare the obtained plurality of 3D models of the real-world environment in various manners.

As one possibility, back-end platform 302 may identify an area (e.g., a room) in a first 3D model of the real-world environment that represents the real-world environment at a first time that looks different than the corresponding area in a second 3D model of the real-world environment that represents the real-world environment at a second time. In some instances, back-end platform 302 may identify one or more objects in the area of the first 3D model that may not be included in the corresponding area of the second 3D model and/or may look different than one or more object in the corresponding area of the second 3D model.

As another possibility, back-end platform 302 may identify an area within a first 3D model of the real-world environment that represents the real-world environment at a first time that looks different than the corresponding area in a second 3D model of the real-world environment that represents the real-world environment at a second time, and then determine what about the area is different based on one or more object recognition techniques. For instance, back-end platform 302 may identify one or more objects in the area of the first 3D model that may not be included in the corresponding area of the second 3D model and/or may look different than one or more object in the corresponding area of the second 3D model. Back-end platform 302 may then compare the identified one or more objects in the area to data that describes individual physical elements of the real-world environment (and/or the relationships between these individual elements) in order to determine what about the area is different.

Back-end platform 302 may compare the obtained plurality of 3D models of the real-world environment in various other manners as well.

After comparing the obtained plurality of 3D models of the real-world environment that represent the real-world environment at different periods of time, back-end platform 302 may then provide insights about the real-world environment. Generally speaking, back-end platform 302 may provide various insights about the real-world environment.

As one example, after comparing the obtained plurality of 3D models of the real-world environment that represent the real-world environment at different periods of time, back-end platform 302 may provide insights about how a construction project is progressing. For instance, by comparing the obtained plurality of 3D models of the real-world environment that represent the real-world environment at different periods of time, back-end platform 302 may determine what objects (e.g., ducts, conduits, pillars, etc.) have been installed in the real-world environment over time In this respect, back-end platform 302 may provide insights about how a construction project is progressing, which may include insights as to how much progress has been made in completing certain tasks for the construction project that may involve installing certain objects in the real-world environment. Back-end platform 302 may provide various other insights about the real-world environment as well.

Back-end platform 302 may also provide insights about the real-world environment in various manners. For example, back-end platform 302 may cause a computing device (e.g., AR-enabled device 312A and/or 312B, or client station 314) to present a user interface that includes insights about the real-world environment (e.g., insights about how the construction project is progressing). Back-end platform 302 may provide such insights in various forms, such as a progress report that may include an indication of how much progress has been made in completing tasks for the project. As another example, back-end platform 302 may send a message (e.g., an email) to a computing device that includes insights about the real-world environment (e.g., insights about how the construction project is progressing).

Back-end platform 302 may provide insights about the real-world environment in various other manners as well.

It should be understood that back-end platform 302 may provide insights about the real-world environment at various times. For instance, back-end platform 302 may provide the insights periodically (e.g., daily, weekly, monthly, etc.) and/or in response to a user request.

VIII. EXAMPLE FUNCTIONS

Figure 5:
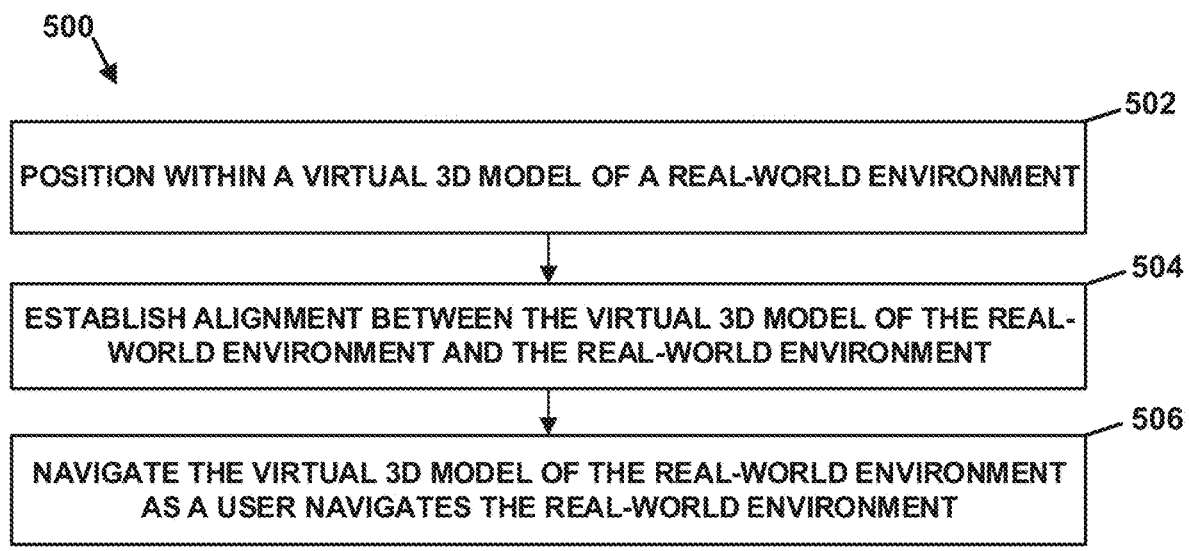
FIG. 5 depicts an example flow chart that may be carried out in accordance with the present disclosure.

Referring now to FIG. 5, a functional block diagram 500 is provided to illustrate some example functions that may be carried out by the disclosed software technology that leverages improved AR technology to facilitate presentation of virtual content overlaid on a view of a real-world environment. As noted above, the disclosed software technology may be embodied in the form of an AR software application that comprises (1) a first software component that functions to position an AR-enabled device within a virtual 3D model of a real-world environment, (2) a second software component that functions to establish alignment between the virtual 3D model of the real-world environment and the real-world environment, and (3) a third software component that functions to navigate the virtual 3D model of the real-world environment as a user navigates the real-world environment.

For the purposes of illustration only, the example functions of these software components are described below as being carried out by an AR-enabled device (AR-enabled device 312A and/or 312B). However, as noted above, it is possible that the responsibility for carrying out these functions could be distributed between two or more of an AR-enable device, a back-end platform (e.g., back-end platform 302) and one or more client stations (e.g., client station 314). Further, it should be understood that the flow diagram in FIG. 5 is merely described in such manner for the sake of clarity and explanation and that some functions may be carried out in various other manners as well, including the possibility that example functions may be added, removed, rearranged into different orders, grouped together, and/or not grouped together at all.

According to an example implementation, at block 502, an AR-enabled device (e.g., AR-enabled device 312A and/or 312B) may position itself within a virtual 3D model of a real-world environment. As described above with respect to the first software component, the AR-enabled device may position itself within a virtual 3D model of a real-world environment in various manners.

At block 504, the AR-enabled device (e.g., AR-enabled device 312A and/or 312B) may establish alignment between the virtual 3D model of the real-world environment and the real-world environment in various manners described above with respect to the second software component.

In turn, at block 506, the AR-enabled device (e.g., AR-enabled device 312A and/or 312B) may navigate the virtual 3D model of the real-world environment as a user navigates the real-world environment. The user experiencing AR may navigate the real-world environment in various manners and the AR-enabled device may navigate the virtual 3D model of the real-world environment as the user navigates the real-world environment in various manners described above with respect to the third software component.

Figure 6:
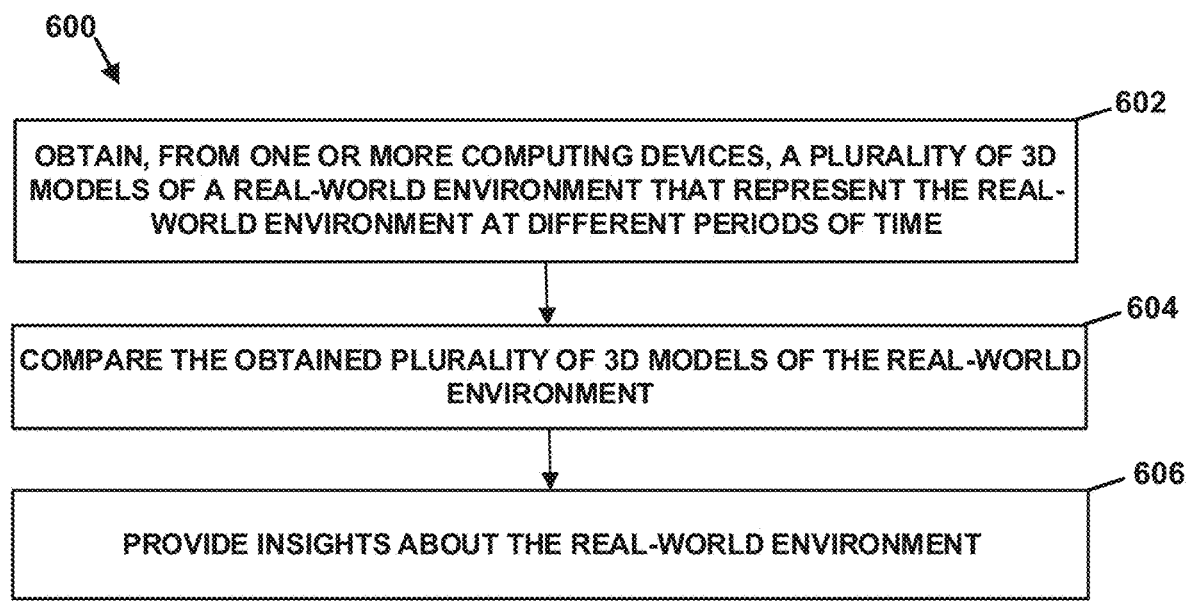
FIG. 6 depicts another example flow chart that may be carried out in accordance with the present disclosure.

Turning to FIG. 6, a functional block diagram 600 is provided to illustrate some other example functions that may be carried out by the disclosed insights software application. For the purposes of illustration only, these example functions of the insights software application are described below as being carried out by a back-end platform (e.g., back-end platform 302). However, as noted above, it is possible that the responsibility for carrying out these functions could be distributed between an AR-enabled device (e.g., AR-enabled device 312A and/or 312B) and/or one or more client stations (e.g., client station 314). Further, it should be understood that the flow diagram in FIG. 6 is merely described in such manner for the sake of clarity and explanation and that some functions may be carried out in various other manners as well, including the possibility that example functions may be added, removed, rearranged into different orders, grouped together, and/or not grouped together at all.

According to an example implementation, at block 602, the back-end platform (e.g., back-end platform 302) may obtain, from one or more computing devices (e.g., AR-enabled device 312A, AR-enabled device 312B, and/or client station 314), a plurality of 3D models of a real-world environment that represent the real-world environment at different periods of time. As described above, the back-end platform may obtain the plurality of 3D models of the real-world environment in various manners and at various times.

At block 604, the back-end platform (e.g., back-end platform 302) may then compare the obtained plurality of 3D models of the real-world environment. As described above, the back-end platform may compare the obtained plurality of 3D models of the real-world environment in various manners.

In turn, at block 606, the back-end platform (e.g., back-end platform 302) may provide insights about the real-world environment (e.g., insights about how the construction project is progressing). As described above, e back-end platform may provide the insights in various manners and at various times.

IX. CONCLUSION

Example embodiments of the disclosed innovations have been described above. Those skilled in the art will understand, however, that changes and modifications may be made to the embodiments described without departing from the true scope and sprit of the present invention, which will be defined by the claims.

For instance, those in the art will understand that the disclosed AR software application running on an AR-enabled device may facilitate user interaction with a virtual 3D model of a real-world environment that may not necessarily be associated with a construction project.

Further, to the extent that examples described herein involve operations performed or initiated by actors, such as "humans," "operators," "users" or other entities, this is for purposes of example and explanation only. The claims should not be construed as requiring action by such actors unless explicitly recited in the claim language.

What is claimed is:

1. A computing device comprising:
   one or more sensors;
   a user input interface;
   a display screen;
   at least one processor;
   a non-transitory computer-readable medium; and
   program instructions stored on the non-transitory computer-readable medium that are executable by the at least one processor such that the computing device is configured to:
      detect voice input via the user input interface, wherein the detected voice input indicates a selection of one or both of a position or an orientation within a virtual three-dimensional (3D) model of a real-world environment;
      based on the detected voice input, determine an initial position and orientation of the computing device within the virtual 3D model of the real-world environment;
      align the virtual 3D model of the real-world environment with the real-world environment; and
      cause the display screen to present the aligned virtual 3D model as overlaid virtual content on a view of the real-world environment.

2. The computing device of claim 1, wherein the program instructions that are executable by the at least one processor such that the computing device is configured to align the virtual 3D model of the real-world environment with the real-world environment comprises program instructions that are executable by the at least one processor such that the computing device is configured to:
   capture, via the one or more sensors, sensor data that is representative of the real-world environment surrounding the computing device;
   based on an analysis of the captured sensor data, detect at least one object in the real-world environment surrounding the computing device;
   compare the at least one detected object to data defining physical elements that are represented within the virtual 3D model;
   based on the comparison, identify a given physical element represented within the virtual 3D model that matches the detected object; and
   update one or more of a position, an orientation, or a presentation of the virtual 3D model of the real-world environment in order to align the given physical element represented within the virtual 3D model with the detected object in the real-world environment surrounding the computing device.

3. The computing device of claim 2, wherein the given physical element represented within the virtual 3D model comprises a physical element that was previously tagged within the virtual 3D model by a user that was viewing a presentation of the aligned virtual 3D model as overlaid virtual content on a view of the real-world environment.

4. The computing device of claim 1, wherein the program instructions that are executable by the at least one processor such that the computing device is configured to update the position and orientation of the computing device within the virtual 3D model of the real-world environment in order to align the virtual 3D model with the real-world environment comprises program instructions that are executable by the at least one processor such that the computing device is configured to:
   cause the display screen to present a virtual anchor that is overlaid onto a view of the real-world environment surrounding the computing device, wherein the virtual anchor corresponds to a given physical element in the real-world environment;

detect user input via one or both of the one or more sensors or the user input interface, wherein the detected user input indicates a modification to one or more of a position of the virtual anchor, an orientation of the virtual anchor, or a size of the virtual anchor; and based on the received user input, update one or more of a position, an orientation, or a presentation of the virtual 3D model of the real-world environment in order to align the virtual 3D model with the real-world environment.

5. The computing device of claim 1, further comprising program instructions stored on the non-transitory computer-readable medium that are executable by the at least one processor such that the computing device is configured to:

based on sensor data captured by the one or more sensors, detect that the computing device has moved within the real-world environment;

update the position and orientation of the computing device within the virtual 3D model of the real-world environment in accordance with the detected movement of the computing device within the real-world environment; and cause the display screen to update the presentation of the aligned virtual 3D model as overlaid virtual content on the view of the real-world environment to reflect the updated position and orientation of the computing device within the virtual 3D model.

6. The computing device of claim 1, further comprising program instructions stored on the non-transitory computer-readable medium that are executable by the at least one processor such that the computing device is configured to:

after the computing device has moved within the real-world environment, capture, via the one or more sensors, sensor data that is representative of the real-world environment surrounding the computing device;

based on an analysis of the captured sensor data, detect at least one object in the real-world environment surrounding the computing device;

compare the at least one detected object to data defining physical elements that are represented within the virtual 3D model;

based on the comparison, identify a given physical element represented within the virtual 3D model that matches the detected object;

update the position and orientation of the computing device within the virtual 3D model of the real-world environment in order to align the given physical element represented within the virtual 3D model with the detected object in the real-world environment surrounding the computing device; and cause the display screen to update the presentation of the aligned virtual 3D model as overlaid virtual content on the view of the real-world environment reflect the updated position and orientation of the computing device within the virtual 3D model.

7. The computing device of claim 1, wherein the computing device comprises a head-mounted display.

8. The computing device of claim 1, wherein the real-world environment comprises a construction site for a construction project.

9. The computing device of claim 8, wherein the one or more sensors comprise a Light Detection and Ranging (LiDAR) sensor, and wherein the computing device further comprises program instructions stored on the non-transitory computer-readable medium that are executable by the at least one processor such that the computing device is configured to:

capture, via the LiDAR sensor, 3D sensor data that is representative of the construction site;

based on the captured 3D sensor data, generate a 3D model of the construction site; and transmit the generated 3D model of the construction site to a computing system that is configured to generate progress reports for the construction site.

10. The computing device of claim 1, wherein the 3D model of the real-world environment comprises a 3D model of a construction project having a plurality of named locations, and wherein the selection of one or both of a position or an orientation comprises a selection of one of the named locations in the 3D model of the construction project.

11. The computing device of claim 1, further comprising program instructions that are executable by the at least one processor such that the computing device is configured to:

translate the detected voice input into one or both of a position or an orientation within the virtual three-dimensional (3D) model of a real-world environment.

12. A method performed by a computing device, the method comprising:

detecting voice input, wherein the detected voice input indicates a selection of one or both of a position or an orientation within a virtual three-dimensional (3D) model of a real-world environment;

aligning the virtual 3D model of the real-world environment with the real-world environment; and causing a display screen to present the aligned virtual 3D model as overlaid virtual content on a view of the real-world environment.

13. The method of claim 12, wherein aligning the virtual 3D model of the real-world environment with the real-world environment comprises:

capturing sensor data that is representative of the real-world environment surrounding the computing device;

based on an analysis of the captured sensor data, detecting at least one object in the real-world environment surrounding the computing device;

comparing the at least one detected object to data defining physical elements that are represented within the virtual 3D model;

based on the comparison, identifying a given physical element represented within the virtual 3D model that matches the detected object; and updating one or more of a position, an orientation, or a presentation of the virtual 3D model of the real-world environment in order to align the given physical element represented within the virtual 3D model with the detected object in the real-world environment surrounding the computing device.

14. The method of claim 12, wherein updating the position and orientation of the computing device within the virtual 3D model of the real-world environment in order to align the virtual 3D model with the real-world environment comprises:

causing the display screen to present a virtual anchor that is overlaid onto a view of the real-world environment surrounding the computing device, wherein the virtual anchor corresponds to a given physical element in the real-world environment;

detecting user input, wherein the detected user input indicates a modification to one or more of a position of the virtual anchor, an orientation of the virtual anchor, or a size of the virtual anchor; and based on the received user input, updating one or more of a position, an orientation, or a presentation of the virtual 3D model of the real-world environment in order to align the virtual 3D model with the real-world environment.

15. The method of claim 12, the method further comprising:
after the computing device has moved within the real-world environment, capturing sensor data that is representative of the real-world environment surrounding the computing device;
based on an analysis of the captured sensor data, detecting at least one object in the real-world environment surrounding the computing device;
comparing the at least one detected object to data defining physical elements that are represented within the virtual 3D model;
based on the comparison, identifying a given physical element represented within the virtual 3D model that matches the detected object;
updating the position and orientation of the computing device within the virtual 3D model of the real-world environment in order to align the given physical element represented within the virtual 3D model with the detected object in the real-world environment surrounding the computing device; and
causing the display screen to update the presentation of the aligned virtual 3D model as overlaid virtual content on the view of the real-world environment reflect the updated position and orientation of the computing device within the virtual 3D model.

16. The method of claim 12, wherein the 3D model of the real-world environment comprises a 3D model of a construction project having a plurality of named locations, and wherein the selection of one or both of a position or an orientation comprises a selection of one of the named locations in the 3D model of the construction project.

17. A non-transitory computer-readable medium having program instructions stored thereon that are executable such that a computing device is configured to:
detect voice input via the user input interface, wherein the detected voice input indicates a selection of one or both of a position or an orientation within a virtual three-dimensional (3D) model of a real-world environment;
based on the detected voice input, determine an initial position and orientation of the computing device within the virtual 3D model of the real-world environment;
align the virtual 3D model of the real-world environment with the real-world environment; and
cause a display screen of the computing device to present the aligned virtual 3D model as overlaid virtual content on a view of the real-world environment.

18. The non-transitory computer-readable medium of claim 17, wherein the program instructions stored on the non-transitory computer-readable medium such that the computing device is configured to align the virtual 3D model of the real-world environment with the real-world environment comprises program instructions that are executable such that the computing device is further configured to:
capture, via one or more sensors of the computing device, sensor data that is representative of the real-world environment surrounding the computing device;
based on an analysis of the captured sensor data, detect at least one object in the real-world environment surrounding the computing device;
compare the at least one detected object to data defining physical elements that are represented within the virtual 3D model;
based on the comparison, identify a given physical element represented within the virtual 3D model that matches the detected object; and
update one or more of a position, an orientation, or a presentation of the virtual 3D model of the real-world environment in order to align the given physical element represented within the virtual 3D model with the detected object in the real-world environment surrounding the computing device.

19. The non-transitory computer-readable medium of claim 17, wherein the 3D model of the real-world environment comprises a 3D model of a construction project having a plurality of named locations, and wherein the selection of one or both of a position or an orientation comprises a selection of one of the named locations in the 3D model of the construction project.

20. The non-transitory computer-readable medium of claim 17, further comprising program instructions stored thereon that are executable such that the computing device is configured to:
translate the detected voice input into one or both of a position or an orientation within the virtual three-dimensional (3D) model of a real-world environment.

* * * * *